United States Patent
Griggs et al.

(10) Patent No.: US 12,463,933 B1
(45) Date of Patent: *Nov. 4, 2025

(54) GENERATING CONTENT BASED ON SEARCH INSTANCES

(71) Applicant: El Toro.Com, LLC, Louisville, KY (US)

(72) Inventors: Stacy B. Griggs, Louisville, KY (US); David T. Stadler, III, Louisville, KY (US); Benjamin Charles Woolley, Bothell, WA (US)

(73) Assignee: EL TORO.COM, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,749

(22) Filed: Apr. 8, 2024

Related U.S. Application Data

(63) Continuation of application No. 17/340,345, filed on Jun. 7, 2021, now Pat. No. 11,956,202, which is a continuation of application No. 16/707,244, filed on Dec. 9, 2019, now Pat. No. 11,032,238, which is a continuation of application No. 15/369,838, filed on Dec. 5, 2016, now Pat. No. 10,505,893, which is a
(Continued)

(51) Int. Cl.
| | |
|---|---|
| *G06F 15/16* | (2006.01) |
| *G06F 16/951* | (2019.01) |
| *H04L 29/12* | (2006.01) |
| *H04L 61/2503* | (2022.01) |
| *H04L 61/5007* | (2022.01) |
| *H04L 101/668* | (2022.01) |
| *H04L 101/69* | (2022.01) |

(52) U.S. Cl.
CPC ........ *H04L 61/2503* (2013.01); *G06F 16/951* (2019.01); *H04L 61/5007* (2022.05); *H04L 2101/668* (2022.05); *H04L 2101/69* (2022.05)

(58) Field of Classification Search
CPC ............. H04L 61/2503; H04L 61/5007; H04L 2101/668; H04L 2101/69; G06F 16/951
See application file for complete search history.

(56) References Cited

U.S. PATENT DOCUMENTS

| | | |
|---|---|---|
| 5,946,679 A | 8/1999 | Ahuja et al. |
| 6,625,662 B1 | 9/2003 | Satoh et al. |
| (Continued) | | |

OTHER PUBLICATIONS

New Movers Database; Experian Marketing Services, Experian Information Solutions, Inc. (2008) 2 pages. Nov. 1, 2008.

*Primary Examiner* — Abdullahi E Salad
(74) *Attorney, Agent, or Firm* — Gray Ice Higdon

(57) ABSTRACT

Methods and apparatus related to determining and/or utilizing one or more attributes for an Internet Protocol (IP) address and/or other source identifier(s). In some implementations, the attributes may include a physical address and/or email address associated with the source identifier(s). Some implementations are directed to determining physical addresses for inclusion in a postal campaign and/or determining email addresses for inclusion in an email campaign. In some of those implementations, the physical addresses and/or email addresses are determined based on computing devices having source identifiers associated with those addresses having submitted searches with search content assigned to the campaign.

20 Claims, 17 Drawing Sheets

Related U.S. Application Data continuation-in-part of application No. 14/547,915, filed on Nov. 19, 2014, now Pat. No. 9,515,984.

(60) Provisional application No. 61/906,027, filed on Nov. 19, 2013.

(56) References Cited

U.S. PATENT DOCUMENTS

| | | | |
|---|---|---|---|
| 6,665,297 | B1 | 12/2003 | Hariguchi et al. |
| 6,868,389 | B1 | 3/2005 | Wilkins |
| 7,558,687 | B1 | 7/2009 | Bode |
| 8,145,754 | B2 | 3/2012 | Chamberlain et al. |
| 8,204,965 | B2 | 6/2012 | Shkedi |
| 8,346,770 | B2 * | 1/2013 | Smith ............... G06F 16/9537 707/771 |
| 8,386,293 | B2 | 2/2013 | Nugent et al. |
| 8,548,910 | B1 | 10/2013 | Hamilton et al. |
| 8,676,799 | B1 | 3/2014 | Vaver |
| 8,712,805 | B1 * | 4/2014 | Ferries ............... G06Q 50/16 382/113 |
| 9,026,145 | B1 | 5/2015 | Duleba et al. |
| 9,177,281 | B2 | 11/2015 | Parameswaran et al. |
| 9,277,365 | B1 | 3/2016 | Wilden et al. |
| 9,515,984 | B1 | 12/2016 | Griggs et al. |
| 9,742,727 | B1 | 8/2017 | Griggs et al. |
| 11,956,202 | B1 | 4/2024 | Griggs |
| 2002/0002590 | A1 | 1/2002 | King et al. |
| 2002/0032608 | A1 | 3/2002 | Kanter |
| 2002/0059197 | A1 | 5/2002 | Hunter et al. |
| 2003/0036949 | A1 * | 2/2003 | Kaddeche ............ G06Q 30/02 705/14.58 |
| 2003/0079017 | A1 | 4/2003 | Agrawal et al. |
| 2003/0135442 | A1 * | 7/2003 | Kumar ............... G06Q 40/04 705/37 |
| 2005/0136886 | A1 | 6/2005 | Aarnio et al. |
| 2005/0188221 | A1 | 8/2005 | Motsinger et al. |
| 2006/0018325 | A1 | 1/2006 | Conrad |
| 2006/0242024 | A1 | 10/2006 | Mattingly et al. |
| 2007/0078983 | A1 | 4/2007 | Modrall |
| 2008/0062940 | A1 | 3/2008 | Othmer et al. |
| 2008/0196098 | A1 | 8/2008 | Cottrell et al. |
| 2008/0244046 | A1 | 10/2008 | Campbell et al. |
| 2008/0244076 | A1 | 10/2008 | Shah et al. |
| 2008/0255944 | A1 | 10/2008 | Shah et al. |
| 2008/0270224 | A1 * | 10/2008 | Portman ............ G06Q 30/0239 705/26.1 |
| 2009/0005087 | A1 | 1/2009 | Lunati et al. |
| 2009/0012933 | A1 | 1/2009 | Verini |
| 2009/0037602 | A1 | 2/2009 | Patel et al. |
| 2009/0082919 | A1 | 3/2009 | Hershey et al. |
| 2009/0089558 | A1 | 4/2009 | Bradford et al. |
| 2009/0147798 | A1 | 6/2009 | Prado |
| 2009/0216642 | A1 * | 8/2009 | Ho .................... G06F 16/958 705/14.25 |
| 2009/0234738 | A1 | 9/2009 | Britton et al. |
| 2010/0030691 | A1 | 2/2010 | Cannon et al. |
| 2010/0036970 | A1 * | 2/2010 | Sidi .................... G06F 15/16 709/245 |
| 2010/0220616 | A1 | 9/2010 | Glyakov et al. |
| 2011/0035284 | A1 | 2/2011 | Moshfeghi |
| 2011/0044226 | A1 | 2/2011 | Song et al. |
| 2011/0119133 | A1 | 5/2011 | Igelman et al. |
| 2011/0177829 | A1 | 7/2011 | Platt et al. |
| 2011/0294464 | A1 | 12/2011 | Fiatal |
| 2012/0005017 | A1 | 1/2012 | Gupta |
| 2012/0011068 | A1 | 1/2012 | Dearing et al. |
| 2012/0029314 | A1 | 2/2012 | Paquet et al. |
| 2012/0102169 | A1 | 4/2012 | Yu et al. |
| 2012/0174220 | A1 | 7/2012 | Rodriguez |
| 2012/0330757 | A1 | 12/2012 | Heidenreich et al. |
| 2013/0060633 | A1 * | 3/2013 | St-Pierre ............ G06Q 30/0251 705/14.58 |
| 2013/0138509 | A1 | 5/2013 | Ruarte et al. |
| 2013/0148573 | A1 | 6/2013 | Boland et al. |
| 2013/0173573 | A1 | 7/2013 | Song et al. |
| 2013/0218710 | A1 | 8/2013 | Golden et al. |
| 2013/0268375 | A1 | 10/2013 | Isbister |
| 2013/0297426 | A1 * | 11/2013 | Marx ................ G06Q 30/0269 705/14.66 |
| 2013/0326554 | A1 | 12/2013 | Shkedi |
| 2014/0019561 | A1 * | 1/2014 | Belity ................ H04L 51/42 709/206 |
| 2014/0032326 | A1 | 1/2014 | Li et al. |
| 2014/0037074 | A1 | 2/2014 | Bravo et al. |
| 2014/0077964 | A1 | 3/2014 | Beligere et al. |
| 2014/0089024 | A1 | 3/2014 | Mason et al. |
| 2014/0126419 | A1 | 5/2014 | Boland et al. |
| 2014/0156669 | A1 * | 6/2014 | Bati .................. G06F 16/2228 707/741 |
| 2014/0208424 | A1 | 7/2014 | Hudack et al. |
| 2014/0222571 | A1 | 8/2014 | Chandra et al. |
| 2014/0244329 | A1 | 8/2014 | Urban |
| 2014/0244351 | A1 | 8/2014 | Symons |
| 2014/0278973 | A1 * | 9/2014 | Lowe ................ G06Q 30/0255 705/14.53 |
| 2014/0280898 | A1 | 9/2014 | Voit et al. |
| 2014/0289036 | A1 | 9/2014 | Aurigemma |
| 2014/0324810 | A1 | 10/2014 | Wang et al. |
| 2015/0032551 | A1 * | 1/2015 | Ekambaram ....... G06Q 30/0271 705/14.67 |
| 2015/0106198 | A1 | 4/2015 | Miller et al. |
| 2015/0186936 | A1 | 7/2015 | Sitarzewski |
| 2015/0244819 | A1 * | 8/2015 | Duleba ............... H04L 67/52 709/203 |
| 2015/0271132 | A1 | 9/2015 | Erb |
| 2015/0381490 | A1 | 12/2015 | Perez et al. |
| 2016/0021178 | A1 | 1/2016 | Liu et al. |
| 2016/0247175 | A1 | 8/2016 | Milton et al. |
| 2016/0344751 | A1 | 11/2016 | Leach |
| 2016/0379279 | A1 | 12/2016 | Ashery et al. |
| 2017/0178270 | A1 | 6/2017 | Gersh et al. |

* cited by examiner

GENERATING CONTENT BASED ON SEARCH INSTANCES

BACKGROUND

Various entities utilize mailing lists to send postal materials to physical addresses. The physical addresses included in a mailing list for a postal campaign of a company may be selected based on their geographic properties (e.g., certain ZIP codes may be targeted), based on a customer list of the company, and/or based on other criteria developed from a list of desired attributes of the intended targets.

Separately, various techniques are utilized to ascertain additional information regarding a visitor to a webpage so that online content may be better tailored to the visitor. Conventional techniques rely on usage of cookies during browsing sessions, device fingerprinting, mapping users to a device ID, and/or user provided verification information (e.g., a "single sign-on" system) to ascertain additional information about a user.

However, the two separate techniques mentioned above, and/or other techniques, may suffer from one or more drawbacks.

SUMMARY

Some implementations of this specification are directed generally to determining one or more attributes to associate with an Internet Protocol (IP) address. In some of those implementations, the attributes may include a physical address and/or an email address to associate with the IP address.

Some implementations of this specification are additionally and/or alternatively directed to determining physical addresses for use in a postal campaign (i.e., a direct mail marketing campaign) based on computing devices having source identifiers (e.g., IP addresses, device ID or other deterministic sources of user identification) associated with those physical addresses having submitted searches (e.g., web or "app" searches) assigned to the campaign and/or having retrieved content of one or more electronic resources (e.g., webpages) assigned to the campaign. Searches being assigned to the campaign may include implicit or explicit assignment of content of those searches being mapped to the campaign, such as content assigned to the searches where that content is derived from machine learning that use heuristic linkages for seemingly unrelated searches to derive what content users are searching for. As one example, assume Company A desires to provide postal materials to users who submit searches about Topic A. One or more computer systems may capture IP addresses, device IDs, or other identifiers associated with computing devices that submit such searches about Topic A. For instance, the IP addresses may be captured by: a search engine that receives and acts upon such searches, plug-ins or other applications of computing devices that submit such searches, computer systems of Internet service providers that transmit such searches, and/or other source(s). Further, one or more computer systems may determine, for each of a plurality of the IP addresses that submitted searches about Topic A, a corresponding physical address mapped to the IP address. The corresponding physical address may be utilized as an address for addressing postal materials directed to a campaign that is relevant to Topic A.

Some implementations of this specification are additionally and/or alternatively directed to determining email addresses for use in an email campaign based on computing devices having source identifiers (e.g., IP addresses) associated with those physical addresses having submitted searches assigned to the campaign and/or having retrieved content of one or more electronic resources (e.g., search results, webpages) assigned to the campaign. As one example, assume Company A desires to provide email materials to users who submit searches about Topic A. One or more computer systems may capture IP addresses associated with computing devices that submit such searches about Topic A. Further, one or more computer systems may determine, for each of a plurality of the IP addresses that submitted searches about Topic A, a corresponding email address mapped to the IP address. The corresponding email address may be utilized as an address for addressing email materials directed to a campaign that is relevant to Topic A.

Some implementations of this specification are additionally and/or alternatively directed to determining additional IP addresses and/or other additional source identifiers for use in a campaign (e.g., email, postal, and/or digital (e.g., ads provided in response to a webpage visit) campaign) based on those additional IP addresses (or other additional source identifiers) being similar to one or more IP addresses (or other source identifiers) that have submitted searches assigned to the campaign and/or that have retrieved content of one or more electronic resources assigned to the campaign. In many of those implementations, the additional IP addresses may themselves not have submitted searches assigned to the campaign and/or retrieved content of one or more electronic sources assigned to the campaign. As one example, assume Company A desires to provide campaign materials to users who might be interested in replacing a roof due to hail damage. One or more computer systems may capture IP addresses associated with computing devices that submit searches about replacing a roof due to hail damage (e.g., searches of "hail damage roof", "fix roof hail", etc.). Further, one or more computer systems may determine a plurality of additional IP addresses that are similar to (e.g., geographically similar to) the IP addresses that submitted such searches. The additional IP addresses may then be used to provide campaign materials. For example, digital campaign materials may be provided in response to requests from the additional IP addresses, email campaign materials may be provided to email addresses corresponding to the additional IP addresses, and/or postal materials may be provided to physical addresses corresponding to the additional IP addresses.

In some implementations, non-address content included in particular provided campaign content, is determined based on one or more attributes associated with the IP address or other source identifier utilized to direct the particular provided campaign content. For example, for a given IP address, the one or more attributes may include, for example, attributes associated with a search submitted from the given IP address and associated with the campaign. Also, for example, for the given IP address the one or more attributes may include, for example, a business or other entity associated with the given IP address, demographic data associated with the given IP address, data derived from previous online interactions associated with the given IP address, etc.

Some implementations are additionally and/or alternatively directed to one or more techniques for maintaining user privacy in one or more methods described herein and/or for protecting possibly sensitive search content utilized in one or more methods described herein.

As described above, some implementations generally relate to determining a physical address for an IP address, such as a physical address that identifies one or more of a street address, a city, a state, a ZIP code, a census block, and/or a neighborhood. In some of those implementations, physical addresses may be determined for IP addresses based on internet traffic originating from one or more requests associated with the IP addresses, such as webpage requests, advertisement demand-side platform (DSP) requests, and/or other web-based requests. Request data associated with each of those requests may be provided and may include identifying information about the user and/or computing device that originated the respective request. In some implementations, a physical address may be determined for an IP address based on such request data and optionally based on data from one or more available secondary sources. For example, in some implementations a physical address included in the request data may only be determined to be the physical address for the IP address when the physical address corresponds to data from one or more secondary sources, such as data that indicates a geographic area known to be associated with the IP address and/or trace route information associated with the IP address. Also, for example, in some implementations request data associated with an IP address may include a username, last name, and/or other identifying information and may be compared to a listing of information for multiple users, such as a census listing, customer listing, or other listing of individuals and addresses to determine a physical address to associate with an IP address. In some implementations, where multiple requests are associated with an IP address, characteristics of those multiple requests may be compared to one another (and/or secondary data) to determine if it is appropriate to determine and assign a physical address for that IP address. For example, determining whether it is appropriate to determine and assign a physical address for an IP address may be based on computing device type(s) associated with the multiple requests, temporal characteristics associated with the requests (time of requests, duration of requests, etc.), connection speeds associated with the requests, webpages associated with the requests, and/or account information associated with the requests.

Some implementations generally relate to determining one or more categories that are associated with an IP address, such as categories indicative of the IP address being residential, commercial, a hotspot, etc. In some of those implementations, a likelihood value may be determined that the IP address is associated with each of one or more of the categories. For example, in some implementations a likelihood value indicative of an IP address being residential and/or commercial may be determined based on request data associated with one or more requests originating from the IP address, times and/or duration of the requests, and/or other characteristics of the requests.

Some implementations generally relate to determining one or more fraud scores for an IP address that provide an indication of likelihood that requests originating from the IP address are fraudulent. In some of those implementations, the fraud score for an IP address may be based at least in part on a quantity of advertisement selections associated with the IP address (e.g., a strict quantity per day or other time period and/or a click through rate). In some of those implementations, the fraud score for an IP address may additionally or alternatively be based at least in part on a quantity of credit card charge-backs and/or other indications of fraud that are determined to be associated with the IP address based on secondary data. In some implementations, a fraud score for a particular request from an IP address may additionally or alternatively be determined based at least in part on comparison of data associated with that particular request to a physical address and/or category (and optionally a likelihood that the IP address meets the criteria for that category) associated with that IP address. For example, an IP address' request that includes credit card information may be identified as likely fraudulent if a ZIP code associated with the credit card information does not match one or more physical location ZIP codes associated with that IP address.

In some implementations, the physical location and/or fraud score for an IP address may be determined based at least in part on secondary information that includes a mapping of one or more masked address to an indication of the physical location. For example, a physical location for an IP address may be identified based on request data, and the veracity of one or more aspects of the physical location may be determined based on the mapping one or more masked IP address to the indication of the physical location. For instance, the indication of the physical location may include a mean or median ZIP code mapped to a masked address, and one or more statistical distributions of ZIP codes around the mean or median ZIP code. The ZIP code for the physical location identified in the request data is accurate may be determined by applying the statistical distribution associated with the masked address and determining a confidence level for the physical location. Some implementations of the disclosure are directed generally to generating a mapping of one or more masked IP addresses to one or more indications of physical locations.

In some implementations, a method implemented by one or more processors is provided and includes receiving a search instance. The received search instance includes: an IP address transmitted over one or more networks in conjunction with electronic submission of at least one search associated with the search instance; and search content of the one search associated with the search instance. The IP address indicates a source of the electronic submission of the search, and the search content indicates at least one of: content included in the search and content provided in response to the search. The method further includes: identifying a campaign based on the campaign being electronically stored in association with the search content of the search instance; and identifying an additional IP address that is similar to the IP address of the search instance. The method further includes, based on the campaign being electronically stored in association with the search content of the search instance, and based on the additional IP address being similar to the IP address of the search instance: assigning the campaign to the additional IP address in one or more computer readable media for providing electronic campaign content tailored to the campaign in response to a future electronic request from the additional IP address.

This method and other implementations of technology disclosed herein may each optionally include one or more of the following features.

In some implementations, the method further includes: receiving the future request from the additional IP address; and transmitting, in response to the future request, the electronic campaign content for electronically providing to the additional IP address, where the transmitting is based on the campaign being assigned to the additional IP address in the one or more computer readable media. In some of those implementations, the future request is not associated with electronic submission of a search and/or the additional IP address is not associated with any direct requests from the additional IP address that are directly associated with the campaign.

In some implementations, identifying the additional IP address that is similar to the IP address includes: identifying a physical address that is electronically stored in association with the IP address; and identifying the additional IP address based on either: the physical address also being stored in association with the IP address, and/or determining that an additional physical address (stored in association with the IP address) satisfies one or more geographic proximity criteria relative to the physical address.

In some implementations, the method further includes: determining an additional physical address that is electronically stored in association with the additional IP address; and assigning the campaign to the additional physical address in one or more of the computer readable media for providing, to the additional physical address, postal campaign content tailored to the campaign.

In some implementations, the method further includes: determining an email address that is electronically stored in association with the additional IP address; and assigning the campaign to the email address in one or more of the computer readable media for providing, to the email address, an email that includes email campaign content tailored to the campaign. In some of those implementations, the method further includes: generating the email that includes the email campaign content; and transmitting the email to the email address via one or more networks.

In some implementations, a method implemented by one or more processors is provided and includes receiving, via one or more networks, search instances. Each of the search instances include: a source identifier transmitted over one or more networks in conjunction with submission of one or more searches associated with the search instance, and search content of the one or more searches associated with the search instance. The source identifier indicates one or more characteristics of at least one of: at least one computing device that submitted the one or more searches and a user of the at least one computing device that submitted the one or more searches. The search content indicates at least one of: content included in one or more of the searches and content provided in response to one or more of the searches. The method further includes: determining a group of the search instances based on the search content of the search instances of the group being assigned to campaign parameters in one or more electronic databases; determining, for each of a plurality of the search instances of the group, a particular email address or particular mailing address that is assigned in one or more electronic databases to the source identifier of the search instance; and transmitting, via one or more of the networks, content that identifies the campaign parameters and that includes or is mapped to the particular email addresses or the particular physical addresses determined for the search instances of the group.

This method and other implementations of technology disclosed herein may each optionally include one or more of the following features.

In some implementations, the method further includes generating a plurality of emails based on the content, wherein each of the emails is directed to a corresponding email address of the particular email addresses and includes a subject and a body that is based on the campaign parameters; and transmitting the plurality of emails to the corresponding email addresses. In some versions of those implementations, the content further includes, for a given email address of the particular email addresses, one or more aspects of the search content of one or more of the search instances having the source identifier assigned to the given email address. In some of those versions, generating the plurality of emails based on the content includes generating the email directed to the given email address by tailoring the subject or the body based on the search content.

In some implementations, the content is mapped to the particular email addresses or the particular physical addresses by hash values mapped to the particular email addresses or the particular physical addresses. In some of those implementations, the method further includes generating the hash values based on the particular email addresses or the particular physical addresses.

In some implementations, the method further includes: including, in the content that is transmitted, at least a threshold quantity of additional particular email addresses or additional particular physical addresses that are not included in the search instances of the group.

In some implementations, the method further includes: identifying additional email addresses or additional physical addresses based on geographic similarity of each of the additional email addresses or the additional physical addresses to one or more of the particular email addresses or the particular physical addresses. In some of those implementations, the content further includes or is mapped to the additional email addresses or the additional physical addresses.

In some implementations, the method further includes: identifying an IP address that is similar to one or more of the source identifiers of the search instances, but that is not included in the source identifiers of the search instances; and based on the campaign being electronically stored in association with the search content of the search instance, and based on the IP address being similar to one or more of the source identifiers of the search instances: transmitting, to the IP address in response to a request from the IP address, electronic campaign content that is tailored to the campaign.

In some implementations, one or more of the source identifiers are not IP addresses.

In some implementations, one or more of the source identifiers includes, or is based on: a device ID, a device fingerprint, or a cookie.

In some implementations, a method is provided and includes the steps of: identifying an IP address associated with one or more electronic requests; receiving request data for the IP address, the request data provided in combination with the one or more electronic requests and including one or more of: one or more user web names, one or more user actual names, one or more user street addresses, one or more cities, and one or more ZIP codes; identifying, from an electronic mapping of available secondary information, particular additional information that is associated with at least one of the IP address and the request data, the particular additional information part of the secondary available information and including information that is in addition to the request data; determining a physical location for the IP address based on the request data and the particular additional information; and assigning the physical location to the IP address in one or more databases.

This method and other implementations of technology disclosed herein may each optionally include one or more of the following features.

In some implementations, the secondary information may include a mapping of one or more masked addresses of the IP address to an indication of the physical location, and determining the physical location based on the request data and the particular additional information may include: identifying the physical location based on the request data; and verifying one or more aspects of the physical location are mapped to the IP address in the secondary information. The indication of the physical location in the secondary information may include a numerical indication of the physical location for a masked address of the one or more masked addresses for the IP address and may include a statistical distribution of values. Verifying the one or more aspects of the physical location are mapped to the IP address in the secondary information may include verifying a numerical aspect of the one or more aspects of the physical location is the numerical indication or within an acceptable range based on the statistical distribution of values. The numerical indication may be an ordinal of a geographic ordering system. The method may further include generating the numerical indication of the physical location for the masked address, the generating the numerical indication including the steps of: selecting a set of IP addresses that each have the masked address; identifying a plurality of ordinals of the geographic ordering system, each of the ordinals being associated with one of the IP addresses of the set; calculating an expected value based on the plurality of ordinals; assigning the expected value as the numerical indication; calculating a probability distribution based on the plurality of ordinals and the expected value; and assigning the probability distribution as the statistical distribution of values. The expected value may be one of a mean and a median value, and wherein the probability distribution may indicate one or more deviation probabilities.

In some implementations, the method may further include: assigning the IP address to an electronic advertisement campaign based on the assigned physical address being a target of the electronic advertisement campaign; and serving an electronic advertisement of the electronic advertisement campaign responsive to receiving an electronic advertisement request associated with the IP address.

In some implementations, the particular additional information may include a regional location of the IP address, and the request data may define the physical location at a level of granularity that is more particular than the regional location of the IP address. Determining the physical location for the IP address may be based on the request data and the particular additional information may include verifying the physical location is a subset of the regional location.

In some implementations the particular additional information may include an internet service provider associated with the IP address and one or more geographic locations associated with the internet service provider. Determining the physical location for the IP address based on the request data and the particular additional information includes verifying the physical location based on at least one of the geographic locations and/or based on first party data provided by an internet service provider.

In some implementations, determining the physical location for the IP address based on the request information and the particular additional information may include: comparing the request data to the particular additional information; determining at least a threshold level of the request data corresponds spatially with the particular additional information; and based on determining the threshold level of the request data corresponds spatially with the particular additional information, using as the physical location one of each of one or more of: the one or more user street addresses, the one or more cities, and the one or more ZIP codes. The particular additional information may include traceroute data mapped to the physical location and determining at least a threshold level of the request data corresponds spatially with the particular additional information may include identifying one or more traceroutes of the IP address and determining whether the one or more traceroutes correspond spatially with the traceroute data.

In some implementations, the method may further include receiving fraud data associated with each of one or more of the electronic requests; determining a fraud value for the IP address based on the fraud data; and assigning the fraud value to the IP address in the one or more databases. The fraud data may include indications of whether a credit card charge-back occurred as a result of each of one or more transactions associated with the IP address; and determining the fraud value for the IP address based on the fraud data may include determining the fraud value based on a quantity of the indications. Determining the fraud value may include calculating a ratio of fraudulent to non-fraudulent requests of the electronic requests; and determining the fraud value may include determining whether the ratio exceeds a threshold ratio. Determining the fraud value may include determining a number of fraudulent requests; and determining the fraud value may include determining whether the number of fraudulent requests satisfies a threshold.

In some implementations, a method is provided and includes the steps of: identifying a corpus of IP addresses (and/or other deterministic source(s) of web identification, such as device IDs) and associated numerical identifiers, each of the numerical identifiers identifying a physical location associated with a respective of the IP addresses or a corresponding user; selecting a set of IP addresses that each have a first masked address; identifying the numerical identifiers that are associated with the IP addresses of the set; calculating one of a mean and a median value based on the identified numerical identifiers; calculating a statistical distribution of values based on the identified numerical identifiers; assigning the statistical distribution of values and the one of the mean and the median value to the masked address; receiving an IP address; determining the IP address has the masked address; identifying the statistical distribution of values and the one of the mean and the median value based on determining the IP address has the masked address; determining a likelihood the IP address is associated with a physical location based at least in part on the statistical distribution of values and the one of the mean and the median value; determining the likelihood satisfies a threshold value; and assigning the physical location to the IP address (and/or other deterministic source(s) of web identification) based on the likelihood satisfying the threshold value.

In some implementations, a method is provided and includes the steps of: identifying an IP address associated with one or more electronic requests; receiving request data for the IP address, the request data provided in combination with the one or more electronic requests and including one or more of: one or more user web names, one or more user actual names, one or more user street addresses, one or more cities, and one or more ZIP codes; determining a likelihood value that the IP address is has a categorical attribute based on the request data; and assigning the likelihood value to the IP address in one or more databases.

This method and other implementations of technology disclosed herein may each optionally include one or more of the following features.

In some implementations, the method may further include identifying, from an electronic mapping of available secondary information, particular additional information that is associated with at least one of the IP address and the request data, the particular additional information part of the secondary available information and including information that is in addition to the request data; and wherein determining the categorical attribute of the IP address may be further based on the particular additional information.

In some implementations, the request data may further include at least one of a starting time, an ending time, a message size, and a duration of each of one or more of the requests. Determining the likelihood value that the IP address has the categorical attribute may be based on one or more of the starting time, the ending time, the message size, and the duration of one or more of the requests.

In some implementations, a method is provided and includes: identifying a request originating from an IP address of a user, the request including a physical location; identifying, from one or more databases, an expected physical location associated with the IP address, the expected physical location associated with the IP address in the one or more databases based on request data of one or more previous identifications of requests associated with the IP address; and calculating a likelihood that the request is fraudulent based on comparing the physical location to the expected physical location.

This method and other implementations of technology disclosed herein may each optionally include one or more of the following features.

In some implementations, the one or more databases may include a mapping of a masked address to the expected physical location, and identifying the expected physical location associated with the IP address may include: determining the IP address matches the masked address, and identifying the expected physical location based on the mapping of the expected physical location to the masked address. The expected physical location may include a numerical indication and statistical distribution of values for the numerical indication, and calculating the likelihood that the request is fraudulent based on comparing the physical location to the expected physical location may include calculating the likelihood based on the physical location, the numerical indication, and the statistical distribution of values. The numerical indication may be an ordinal of a geographic ordering system.

In some implementations, the one or more databases may include mappings of a first masked address to the expected physical location and a second masked address to a second expected physical location. Identifying the expected physical location associated with the IP address may include: determining the IP address has the masked address and identifying the expected physical location based on the mapping of the expected physical location to the masked address. The method may further include: determining the IP address has the second masked address; identifying the second expected physical location is consistent with the IP address based on the mapping of the second expected physical location to the second masked address; and calculating the likelihood that the request is fraudulent may be further based on comparing the physical location to the second expected physical location.

In some implementations, a method is provided and includes: identifying a corpus of IP addresses and associated numerical identifiers, each of the numerical identifiers identifying a physical location associated with a respective of the IP addresses; selecting a set of IP addresses that each have a first masked address; identifying the numerical identifiers that are associated with the IP addresses of the set; calculating an expected value based on the identified numerical identifiers; calculating a statistical distribution of values based on the identified numerical identifiers; assigning the statistical distribution of values and the expected value to the masked address; receiving an IP address; determining the IP address has the masked address; identifying the statistical distribution of vales and the expected value based on determining the IP address has the masked address; and determining a likelihood the IP address is associated with an IP address physical location based at least in part on the statistical distribution of values and the expected value.

This method and other implementations of technology disclosed herein may each optionally include one or more of the following features.

In some implementations, the method may further include: determining the likelihood satisfies a threshold value; and assigning the physical location to the IP address based on the likelihood satisfying the threshold value. Receiving the IP address may include receiving the IP address and the physical location responsive to an electronic transaction submission from the IP address and the method may further include: determining a fraud score for the IP address based at least in part on the likelihood; and determining whether to verify the electronic transaction submission based on the fraud score.

Other implementations may include one or more non-transitory computer readable storage media storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
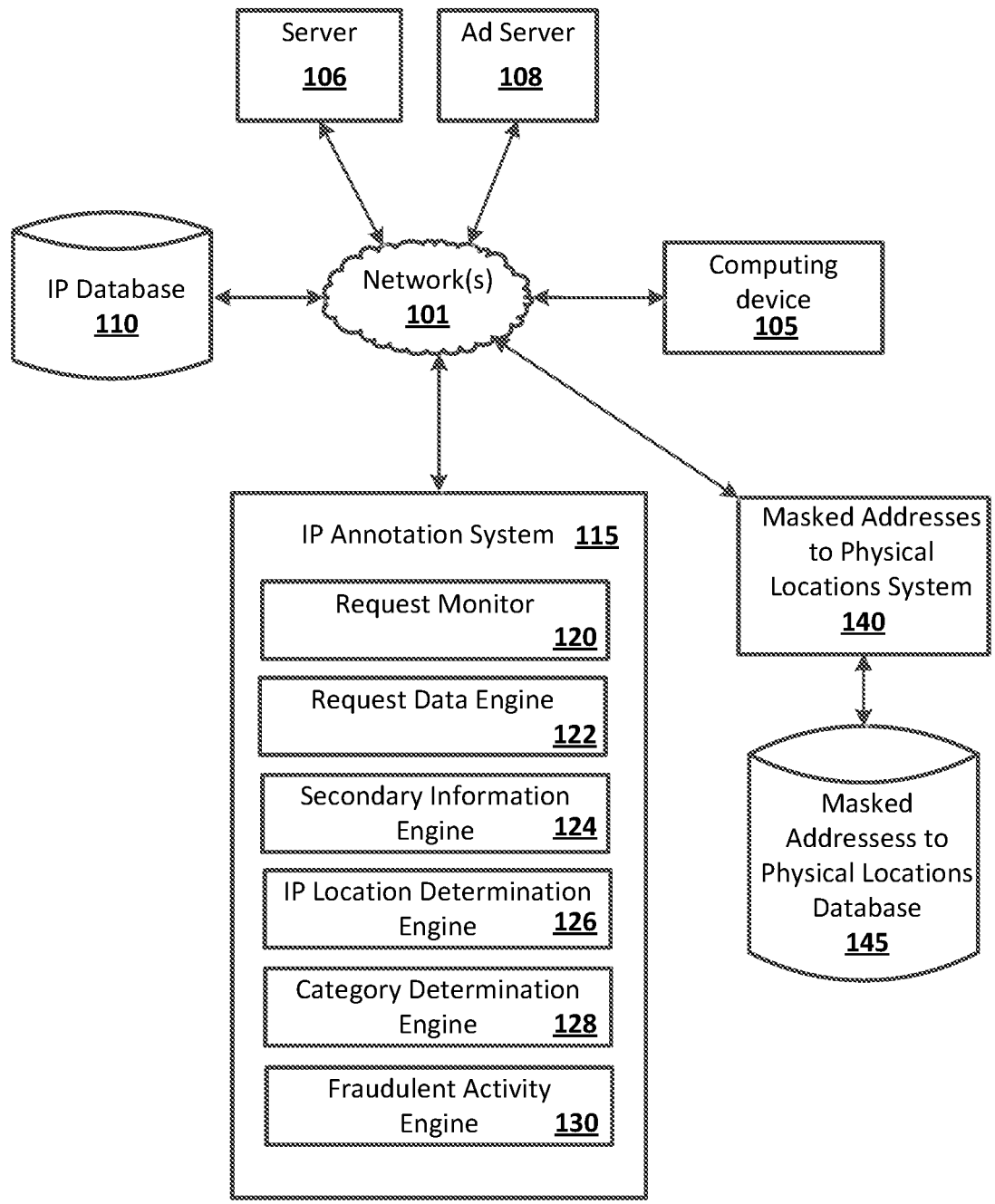
FIG. 1 illustrates an example environment in which one or more attributes of IP addresses may be determined and/or utilized.

FIG. 1 illustrates an example environment in which one or more attributes of IP addresses may be determined and/or analyzed. The example environment of FIG. 1 includes an IP annotation system 115, a computing device 105, a server 106, an ad server 108, an IP database 110, a masked addresses to physical locations system 140, and a masked addresses to physical locations database 145. The IP annotation system 115, the masked addresses to physical locations system 140, and/or other components of the example environment may be implemented in one or more computers that communicate, for example, through one or more networks.

The IP annotation system 115 and the masked addresses to physical locations system 140 are example systems in which the systems, components, and techniques described herein may be implemented and/or with which systems, components, and techniques described herein may interface. One or more aspects of the IP annotation system 115 and/or the masked addresses to physical locations system 140 may be incorporated in a single system in some implementations. Also, in some implementations one or more components of the IP annotation system 115 and/or other components may be incorporated on the computing device 105 and/or the server 106. For example, all or aspects of request monitor 120 may be incorporated on the computing device 105 and/or on the server 106.

Figure 15:
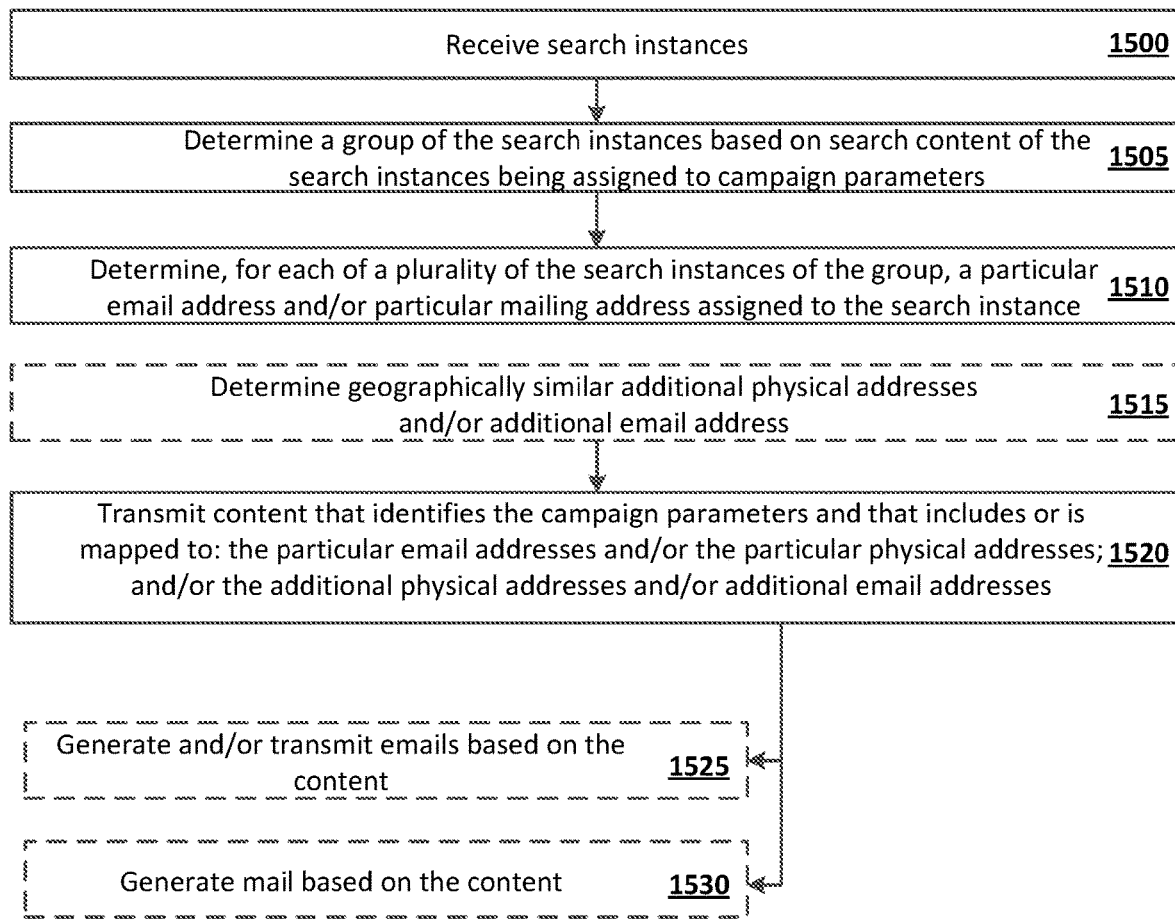
FIG. 15 is a flow chart of an example method according to implementations described herein.

The components of the example environment of FIG. 1 may each include memory for storage of data and software applications, a processor for accessing data and executing applications, and components that facilitate communication over a network. In some implementations, such components may include hardware that shares one or more characteristics with the example computer system that is illustrated in FIG. 15. The operations performed by one or more components of the example environment may optionally be distributed across multiple computer systems. For example, the steps performed by the IP annotation system 115 may be performed via one or more computer programs running on one or more servers in one or more locations that are coupled to each other through a network.

Generally, the IP annotation system 115 determines one or more attributes associated with an IP address, assigns the attributes to the IP address, and stores the IP address with the assigned attributes in IP database 110. In some implementations, IP annotation system 115 may determine a physical address and/or an email address for an IP address. In some implementations, IP annotation system 115 may determine a likelihood value that indicates likelihood an IP address is associated with a category. In some implementations, IP annotation system 115 may determine a fraud score that is indicative of likelihood that one or more electronic requests associated with the IP address are fraudulent.

In some implementations, likely categories, physical locations, and/or fraud scores determined by IP annotation system 115 for IP addresses may be utilized to identify whether and/or which content should be served to those IP addresses. For example, one or more attributes determined by IP annotation system 115 may be utilized by ad server 108 to determine which advertisements to provide in response to requests associated with an IP address based on a determined physical location and/or categories associated with the IP address. Additional description of the IP annotation system 115 is provided herein (e.g., FIGS. 2-9).

In this specification, the term "database" will be used broadly to refer to any electronic collection of data. The data of the database does not need to be structured in any particular way, or structured at all, and it can be stored on storage devices in one or more locations. Thus, for example, the IP database 110 may include multiple collections of data, each of which may be organized and accessed differently. Also, in this specification, the term "entry" will be used broadly to refer to any mapping of a plurality of associated information items. A single entry need not be present in a single storage device and may include pointers or other indications of information items that may be present in unique segments of a storage device and/or on other storage devices. For example, an entry that identifies an IP address and a physical location in IP database 110 may include multiple nodes mapped to one another, with one or more nodes including a pointer to another information item that may be present in another data structure and/or another storage medium.

The computing device 105 may be, for example, a desktop computing device, a laptop computing device, a tablet computing device, and/or a mobile phone computing device. In some implementations, one or more applications may be executing on computing device 105 that may send electronic requests to one or more other computing devices via network 101. For example, a web browser may be executing on computing device 105 and the browser may send one or more electronic requests to be served web content. Requests may be provided to one or more computing devices, such as server 106. The server 106 may be one or more computing devices that may receive requests from one or more other computing devices, such as computing device 105, and provide results for the requests. For example, server 106 may store and provide one or more webpages, and computing device 105 may provide a request to server 106 to be provided with one or more of the webpages. Server 106 may utilize information included with requests, such as IP addresses, request data that is provided with the request, and/or cookie information, to provide one or more of the webpages and/or to determine content of provided webpages. In various implementations IP annotation system 115 may include a request monitor 120, a request data engine 122, a secondary information engine 124, an IP location determination engine 126, a category determination engine 128, and/or a fraudulent activity engine 130. In some implementations, all or aspects of engines 120, 122, 124, 126, 128, and/or 130 may be omitted. In some implementations, all or aspects of engines 120, 122, 124, 126, 128, and/or 130 may be combined. In some implementations, all or aspects of engines 120, 122, 124, 126, 128, and/or 130 may be implemented in a component that is separate from IP annotation system 115, such as computing device 105.

Generally, request monitor 120 identifies webpage requests, advertisement requests, transactional requests, search requests, and/or other requests that originate from computing devices (e.g., computing device 105). Each request includes request data that includes at least an IP address that is associated with that particular computing device. For example, each of one or more computing devices may provide requests for content to server 106, and each of the computing devices may have a unique IP address. The server 106 may forward the requests, directly or indirectly to request monitor 120 and/or request monitor 120 may be executing on the server 106. In some implementations, request monitor 120 may be executing on computing device 105 and may identify the request and provide the request information to one or more other components via network 101. For example, request monitor 120 may identify a user selecting a link on a webpage via a browser executing on computing device 105; and request monitor may provide the IP address of computing device 105, information related to the selected link, such as the URL of the requested webpage, and/or other request data provided with the request, such as cookie information.

In some implementations, request monitor 120 may be executing on a device that receives electronic requests, such as a server that receives requests from multiple IP addresses and provides requested webpages or other requested content. For example, request monitor 120 may be executing on server 106, or an ad exchange system in communication with server 106, and may identify a request when computing device 105 requests a webpage that is stored on server 106. The IP address and other request data provided with each request, such as cookie information and/or user information, may be identified by request monitor 120 when computing device 105 provides the request.

As an example, a user may browse, utilizing computing device 105, to a commercial webpage that is provided by server 106. The user may select an item for purchase and provide personal information, such as name, mailing address, and/or credit card information as request data. After the request is complete, server 106 logs the IP address of the requesting computing device 105 with information related to the transaction. The log is forwarded to the request monitor 120. The request data engine 122 then selects potentially identifying information and forwards the information to one or more components.

Generally, request data engine 122 indexes and/or otherwise prepares the request data that is provided with requests. For example, computing device 105 may send a request for a webpage along with information regarding characteristics of computing device 105 and/or characteristics of the user that initiated the request. Request data may include, for example, email address(es) of the requesting user, user web name(s) of the requesting user, one or more actual names of the requesting user, one or more street addresses associated with the requesting user and/or associated with the computing device 105, and/or one or more other indications of a location, such as a ZIP code, census block, and/or neighborhood. In some implementations, request monitor 120 and/or request data engine 122 may be provided, in whole or in part, on other computing systems (e.g., server 106) and one or more of the other computing systems may provide IP annotation system 115 with IP addresses and request data associated with those IP addresses.

Generally, secondary information engine 124 identifies secondary information from one or more databases. The secondary information is related to one or more IP addresses and may be utilized to determine one or more attributes described herein, such as an indication of the physical location of the IP addresses and/or an indication of email addresses associated with the IP addresses. For example, an ISP may assign IP addresses to customers based on geographic location, and secondary information engine 124 may identify one or more databases or network services provided by network operators or network data aggregators that includes potentially identifying information for each assigned IP address or subnet. In some implementations, particular IP addresses may be assigned regionally and secondary information engine 124 may identify one or more databases that include regional location information for ranges of IP addresses. For example, secondary information engine 124 may identify a database that includes information related to the range of IP addresses used in North America and/or used in particular states within the United States. Additional and/or alternative secondary information may be identified by secondary information engine 124, such as information from masked addresses to physical locations database 145 and/or other data described in examples herein.

Generally, IP location determination engine 126 determines a physical address to associate with an identified IP address. In some implementations, IP location determination engine 126 may receive request data from request data engine 122 and/or secondary information from secondary information engine 124 and determine a physical address to associate with the IP address based on the request data and/or secondary information. IP location determination engine 126 may assign the physical address to the IP address and store the IP address and assigned physical address in IP database 110. In some implementations, IP location determination engine 126 may additionally and/or alternatively determine an email address to associate with the IP address based on the request data and/or secondary information. IP Location determination engine 126 may assign the email address to the IP address and store the association of the email address to the IP address in IP database 110.

In some implementations, IP location determination engine 126 may have access to proprietary information provided by a client and may utilize the information to determine a physical address to associate with an IP address. For example, request data engine 122 may identify a name of a user and an IP address from information included as request data with a request. Secondary information engine 124 may access a customer list of current and/or previous customers of a client to determine a physical address to associate with the IP address. For example, a client may maintain a database of names and addresses of customers and may provide IP annotation system 115 with access to the database. Request data engine 122 may provide the name of a user that is identified from request data provided with a request, and IP location determination engine 126 may access the database to determine a physical address from the customer list of the client based on the identified name. IP location determination engine 126 may store the physical address with the IP address in IP database 110. In some implementations, IP location determination engine 126 may additionally and/or alternatively determine an email address to associate with the IP address based on the request data and/or secondary information. IP Location determination engine 126 may assign the email address to the IP address and store the association of the email address to the IP address in IP database 110.

Generally, the masked addresses to physical locations system 140 generates a mapping of masked IP addresses to numerical indications of physical locations associated with the IP addresses that were masked by one or more netmasks. For example, masked addresses to physical locations system 140 may identify a plurality of IP addresses from IP database 110, each associated with one or more physical locations. Masked addresses to physical locations system 140 may apply a netmask of "255.255.255.0" to the IP addresses, and associate the physical addresses with the resulting masked addresses. The generated mapping may be stored in the masked addresses to physical locations database 145. For example, the mapping may include, for a first masked address, a mapping to a first median ZIP code value and variance for that first masked address, and may include, for a second masked address, a mapping to a second median ZIP code value and variance for that second masked address. Each of the masked addresses may be mapped to additional and/or alternative numerical indications of physical locations such as census districts, voting districts, etc. Moreover, additional and/or alternative netmasks may be applied to the same set of IP addresses to result in different masked addresses. For example, an 8 bit netmask, a 16 bit netmask, a 24 bit netmask, and/or other sizes of netmasks such as 25 bit netmasks, and/or 124 bit netmasks (e.g. for IPv6 IP addresses) may be applied to a set of IP addresses, each resulting in different masked addresses associated with the physical addresses that are associated with the initial IP addresses. As described herein, in some implementations the mappings generated by the masked addresses to physical locations system 140 may be utilized by IP annotation system 115 and/or other components in determining one or more attributes of IP addresses. Additional description of the masked addresses to physical locations system 140 is provided herein (e.g., FIG. 9).

Computing device 105 may request to be served a webpage and server 106 may serve the webpage based on request data that is provided with the request and/or from cookie information that is stored by the browser of computing device 105. While it is understood that multiple users will interact with components of FIG. 1 via multiple client devices, for the sake of brevity, certain examples described in this disclosure may focus on a single user operating the client device 105.

The ad server 108 may be in communication with one or more servers, such as server 106, and may provide one or more advertisements to serve along with content served by server 106 in response to a request. The ad server 108 may serve the advertisements to the computing device 105 directly and/or may provide the advertisement to the server 106 which, in turn, may provide the advertisement to the computing device 105. In some implementations, ad server 108 may receive a request from server 106 to provide an ad, and server 106 may provide ad server 108 with request information related to the webpage requester. In some implementations, an ad exchange system may optionally be functionally interposed between server 106 and ad server 108 to facilitate exchange of information and to enable multiple ad servers to bid on one or more ads to be served responsive to content request to server 106 and/or other servers.

As one example, server 106 may receive a request for a webpage from computing device 105. The requested webpage may include an advertising space, and server 106 may provide an ad exchange system with a request for an advertisement. Ad exchange system may provide multiple ad servers with requests for bid to provide an advertisement to computing device 105 in response to the received request. The requests for bid may optionally include an IP address associated with the computing device 105 and ad server 108 may determine whether to bid, what amount to bid, and/or what campaign content to provide in response to the requests based on one or more determined attributes for that IP address (e.g., based on one or more attributes determined by IP annotation system 115 and/or based on whether that IP address is assigned to one or more campaigns by content generation system 160 (FIG. 10)).

Figure 2:
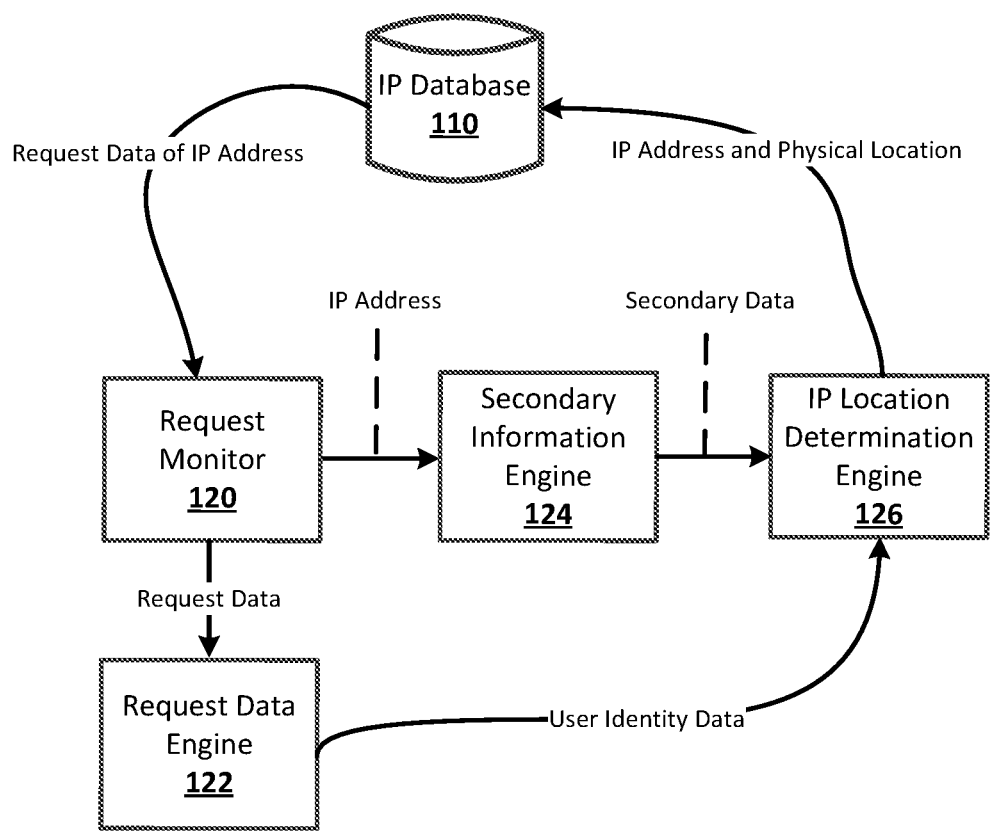
FIG. 2 illustrates an example of determining a physical address to associate with an IP address.

FIG. 2 illustrates an example of determining a physical address to associate with an IP address. The example illustrates the flow of information between sub-engines of the IP annotation system 115 and the IP database 110. To aid in explaining the example of FIG. 2, it will be described in the context of a request originating from computing device 105 and directed to server 106.

Initially, request monitor 120 identifies one or more IP request activities. The IP request activities may be electronic requests originating from computing device 105 and/or may include multiple requests originating from computing device 105 and/or from other computing devices having the same IP address. For example, request monitor 120 may identify five requests for webpages from an IP address of "111.111.111.111" that may all originate from computing device 105 and/or that may originate from one or more computing devices connected to a network and utilizing the same gateway IP address.

In some implementations, one or more of the requests may be provided by computing device 105 with request data. Request monitor 120 may provide and request information that is provided with a request to request data engine 122. Request data engine 122 may receive the request information and identify request data that may be utilized by one or more other component of IP annotation system 115. For example, one or more of the requests originating from computing device 105 may include user credentials of the user that initiated the request, such as a web name of the user, one or more actual names of the user, and/or an email address of the user. Request data engine 122 may identify the credentials and provide the credentials as request data to IP location determination engine 126 to further determine a physical address to associate with "111.111.111.111" and/or to determine an email address to associate with "111.111.111.111." Also, for example, request monitor 120 may identify a request that is provided in conjunction with cookie information that was previously provided to computing device 105. Request data engine 122 may utilize the cookie information to identify request data and provide the request data to IP location determination engine 126.

Request monitor 120 may provide secondary information engine 124 with an IP address that is associated with one or more requests, and secondary information engine 124 may identify, for example, one or more mappings of IP addresses to secondary available information. The secondary available information may include, for example, publicly available databases of IP addresses and current lessees of the IP addresses, proprietary databases of one or more ISPs, and/or other databases that include identifying information of users and physical addresses associated with the users. In some implementations, the secondary available information may be identified from the request. For example, secondary information engine 124 may identify a trace route for a request and utilize location information included with the trace route as secondary available information.

IP location determination engine 126 may receive request data from request data engine 122 that includes identifying information of one or more users that have initiated electronic requests from computing device 105. In some implementations, secondary information engine 124 may provide IP location determination engine 126 with physical location information and/or email address(es) related to the IP address associated with the IP request activity 102. In some implementations, IP location determination engine 126 may determine a physical location and/or email address(es) to associate with the IP address based on the matching location information received from secondary information engine 124, the request data received from request data engine 122, and/or one or more other mappings of users to physical locations. For example, IP location determination engine 126 may identify transaction data that includes user names mapped to physical addresses. IP location determination engine 126 may utilize the user identity data that was identified by request data engine 122 (i.e., information related to a user that is associated with the IP address) to identify a physical address of the user that is identified by the user identity data, and determine a physical location of the IP address based on the identified physical address of the user.

IP location determination engine 126 may utilize the matching location information to verify that the address is correct and/or to disambiguate two potential matches. For example, user identity data may include information related to a "John Smith" and IP location determination engine 126 may identify an address for a John Smith in New York and a John Smith in Los Angeles. The matching location information may include an indication that the IP address is located in the western United States, and IP location determination engine 126 may determine a physical location for the IP address that is the physical address of John Smith in Los Angeles based on the matching location information.

In some implementations, the secondary information engine 124 may identify secondary information from the masked addresses to physical locations database 145. The IP location determination engine 126 may utilize such information to determine and/or verify a physical location for an IP address. For example, secondary information engine 124 may identify one or more masked addresses in masked addresses to physical locations database 145, identify one or more physical locations associated with the identified masked address or addresses, and associate physical locations associated with the identified masked addresses with the IP address.

As an example, secondary information engine 124 may be provided with an IP address of "123.456.789.4." Secondary information engine 124 may apply one or more netmasks to the IP address, and identify matching addresses in masked addresses to physical locations database 145. For example, secondary information engine 124 may apply a netmask of "255.255.255.0," resulting in a masked address of "123.456.789.0" and/or secondary information engine 124 may apply a netmask of "255.255.0.0," resulting in a masked address of "123.456.0.0."

Figure 3:
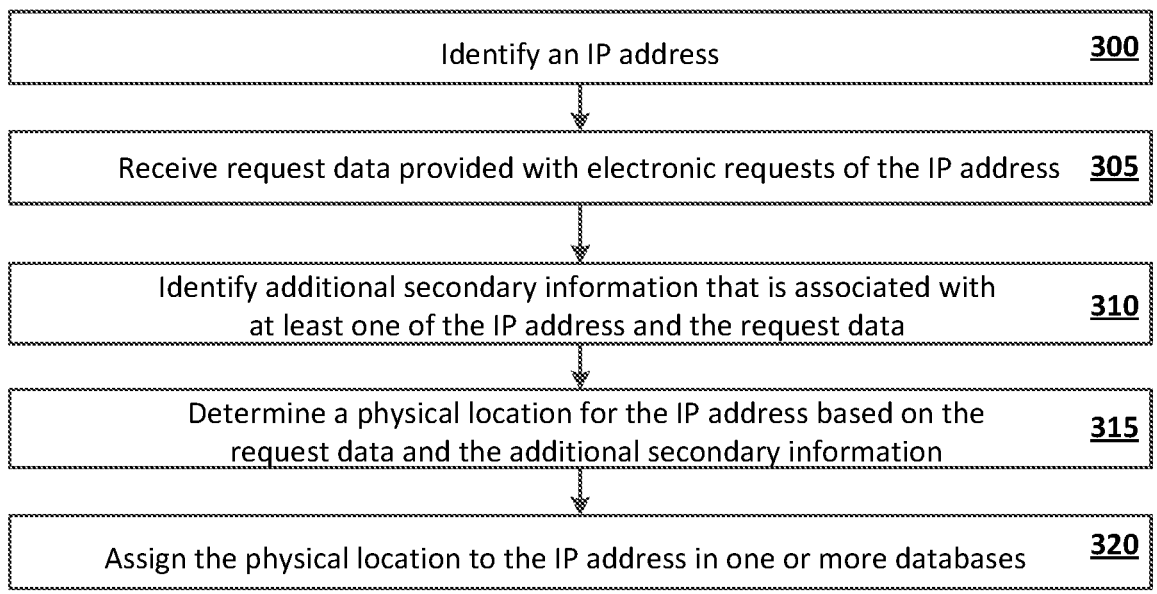
FIG. 3 is a flow chart of an example method for determining a physical address to associate with an IP address.

FIG. 3 is a flow chart of an example method for determining a physical address to associate with an IP address. Other implementations may perform the steps in a different order, omit certain steps, and/or perform different and/or additional steps than those illustrated in FIG. 3. For convenience, aspects of FIG. 3 will be described with reference to one or more components of FIG. 1 that may perform the method, such as IP annotation system 115.

At step 300, an IP address is identified. The IP address may be identified by a component that shares one or more characteristics with request monitor 120. In some implementations, the request monitor 120 may identify an IP address from an electronic request sent by a computing device. For example, computing device 105 may provide a request for a webpage to server 106 and request monitor 120 may identify the IP address of computing device 105 from the request.

At step 305, request data associated with electronic requests are received. The request data may include, for example, information included with cookies provided with a request and/or additional data submitted with the request, such as user information and/or computing device information. In some implementations, request data may be identified by a component that shares one or more characteristics with request data engine 122. For example, request data engine 122 may identify a reference to user information provided in request data.

At step 310, additional secondary information that is associated with the IP and the request data is identified. The additional secondary information may include one or more databases that include mappings of one or more user with one or more physical addresses. For example, secondary information engine 124 may identify a database that includes names and addresses of current and/or previous customers. In some implementations, secondary information engine 124 may identify trace route information from a request as available secondary information. For example, secondary information engine 124 may identify physical locations of the origin and/or path of a request as secondary information.

At step 315, a physical location for the IP address is determined based on the request data and the additional secondary information. The physical location may be determined by a component that shares one or more characteristics with IP location determination engine 126. In some implementations, IP location determination engine 126 may receive request data from request data engine 122 and/or secondary information from secondary information engine 124 and determine a physical address to associate with the IP address based on the request data and/or secondary information. IP location determination engine 126 may assign the physical address to the IP address and store the IP address and assigned physical address in IP database 110.

In some implementations, the secondary information may include a mapping of one or more user attributes to one or more physical addresses, and IP location determination engine 126 may determine a physical address to associate with the IP address based on the user attribute. For example, request monitor 120 may identify a request that includes an IP address associated with request data of "John Smith." Secondary information engine 124 may identify a customer list that includes a mapping of "John Smith" to the ZIP code "40208." IP location determination engine 126 may determine a physical address of "40208" for the IP address based on the identified request data and the secondary information.

In some implementations, the secondary information may include trace route information for the request, and IP location determination engine 126 may determine a physical location for an IP address based on the trace route data. For example, request monitor 120 may identify a request and secondary information engine 124 may identify trace route information for the request, the trace route information including indications of one or more computing devices that handled the request between the initiating device and the receiving device. In some implementations, the trace route information may be utilized to determine a physical location to associate with an IP address and/or to verify an existing IP address that is associated with an IP address.

At step 320, the physical location is assigned to the IP address in one or more databases. The physical location may be assigned to a database that shares one or more characteristics with IP database 110. In some implementations, the physical location and IP address may be stored in a database by a component that shares one or more characteristics with IP location determination engine 126.

In some implementations, IP annotation system 115 may determine one or more categories to associate with an IP address. For example, an IP address may be for a residential computing device, a commercial computing device, and/or the IP address may be publicly accessible to multiple users. IP annotation system 115 may determine a likelihood value that is indicative of whether an IP address matches one or more categories, and the determined likelihood value may be utilized to determine whether future activity from that IP address is fraudulent.

In some implementations, request monitor 120 may identify multiple requests from IP addresses. For example, request monitor 120 may identify incoming requests and store request data that is provided in conjunction with each request in IP database 110. Request data may include, for example, the time of day for each request, the duration of each request, the particular webpage that was requested, cookies provided with requests, and/or other information related to incoming requests.

Category determination engine 128 determines one or more categories that may be associated with an IP address. In some implementations, category determination engine 128 may receive activity data related to one or more IP addresses from request monitor 120 and/or may identify one or more previous requests in IP database 110 that have been annotated with physical location information and/or other information that has been identified by request data engine 122 from request data associated with the requests (e.g., user names, credit card information, computer specifications). For example, category determination engine 128 may identify a plurality of previously identified requests from "111.111.111.111" for one or more webpages. Request monitor 120 may store the requests and request data in IP database 110, and category determination engine 128 may later identify the requests. For example, category determination engine 128 may identify the plurality of requests associated with an IP address of "111.111.111.111," request data engine 122 may identify the request data associated with each of the requests, and category determination engine 128 may determine one or more categories to associate with the IP address based on the request data and/or based on one or more available secondary information sources identified by secondary information engine 124.

In some implementations, category determination engine 128 may determine a category of "residential" to associate with an IP address and further determine a likelihood value that is indicative of likelihood that the IP address is a residential address. For example, category determination engine 128 may determine whether requests originating from an IP address are characteristic of activity from a home and/or from a personal device of a user. In some implementations, category determination engine 128 may determine a likelihood value that is indicative of likelihood that an IP address is a commercial entity. For example, category determination engine 128 may determine a likelihood that an IP address is for a business and/or that the IP address is a hotspot of a business that is accessible by multiple devices.

In some implementations, category determination engine 128 may determine a category of an IP address based on previous activity from the IP address. For example, category determination engine 128 may determine that an IP address is likely a residential device if the number of requests from the IP address is below a threshold number of requests. Also, for example, category determination engine 128 may determine that an IP address is likely a commercial address if the number of requests from the address exceeds a threshold number of requests.

In some implementations, category determination engine 128 may determine a likelihood that an address is residential and/or commercial based on times associated with traffic from the address. For example, category determination engine 128 may determine that an address is more likely a residential address than a commercial address if requests originating from the IP address occur at times that are indicative of residential use, such as between 5 μm and 11 pm. Also, for example, category determination engine 128 may determine that an address is more likely a commercial IP address if requests are most frequent between 9 am and 5 pm.

In some implementations, the requests identified by request monitor 120 may be from multiple devices utilizing the same IP address as a gateway IP address. For example, an IP address may be for a network of multiple devices and/or the IP address may be accessible to multiple devices, such as a public hotspot. Category determination engine 128 may identify that the requests were from multiple devices that are unrelated (e.g., associated with users with different names, users associated with different physical location), and determine a likelihood score that the IP address is a public Wi-Fi location based on the identified requests.

In some implementations, request data engine 122 may identify requests from multiple users from the same IP address. For example, computing device 105 may be a computer that is accessible to multiple users, each with their own account. In some implementations, category determination engine 128 may determine that an address is residential and/or commercial based on the request data associated with the requests. For example, category determination engine 128 may determine that an IP address is likely a residential address if request data engine 122 identifies multiple requests that are associated with users with the same last name. Also, for example, category determination engine 128 may determine that an address is a commercial address based on identifying that the users utilizing the IP address have different last names.

In some implementations, category determination engine 128 may determine that an address is residential and/or commercial based on device information of the device and/or devices that are associated with the IP address. For example, category determination engine 128 may identify that multiple mobile devices have utilized an IP address and determine that the IP address is likely that of a gateway for a private network of a business.

In some implementations, category determination engine 128 may determine that an address is commercial and/or residential based on a physical address associated with the IP address in the IP database 110. For example, request data engine 122 may identify address data that is associated with an IP address, and secondary information engine 124 may identify a database that includes a name associated with the same address, such as a telephone directory. Based on the type of entity associated with the address (i.e., a business versus a person), category determination engine 128 may determine a likely category to associate with the IP address.

In some implementations, request data may include information related to the devices that submitted requests and/or the connection of the devices, and category determination engine 128 may determine a likely category for an IP address based on the connection and/or computing device information. For example, request data associated with one or more requests from an IP location may include connection speed of network 101, and category determination engine 128 may determine that an IP address is likely co-located within a datacenter rather than end-user-facing if the connection speed is above a threshold level, and more likely fraudulent. For example, category determination engine 128 may determine that a request associated with a connection speed of 10 Mbps is 99% likely to be end-user-facing, a connection speed of 100 Mbps is 1% likely to be end-user-facing, and a connection speed of 1000 Mbps is 0.1% likely to be an end-user-facing IP address.

Figure 4:
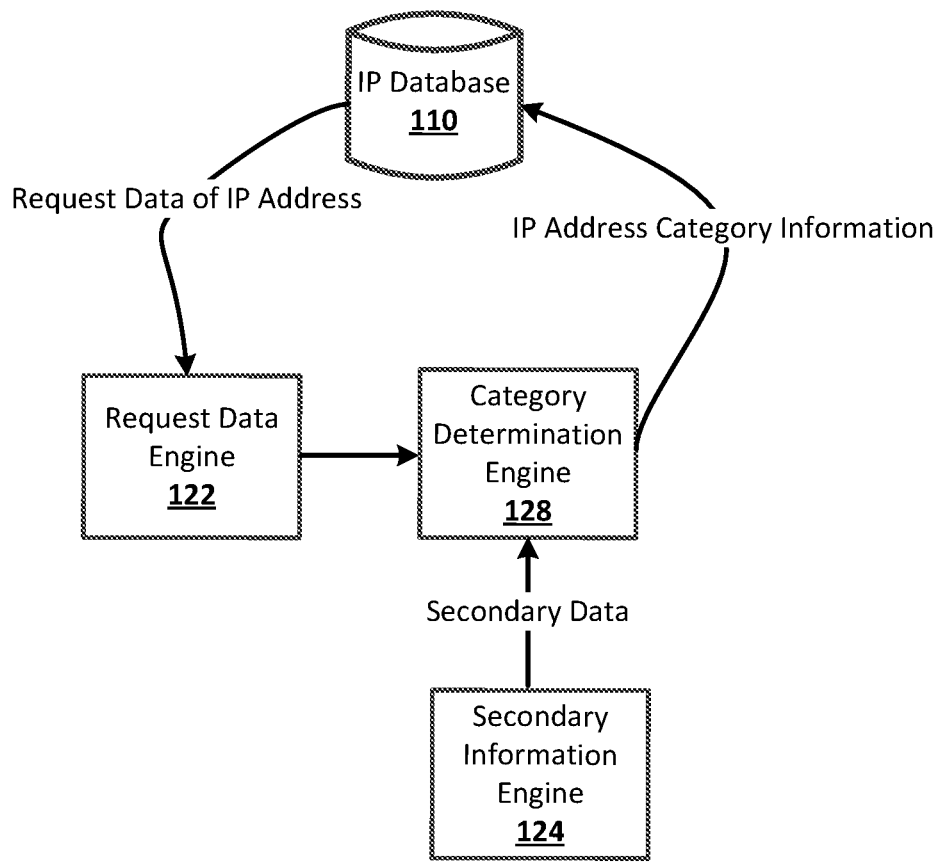
FIG. 4 illustrates an example of determining a likelihood value that is indicative of a category being associated with an IP address.

FIG. 4 illustrates an example of determining a likelihood value that is indicative of a category being associated with an IP address. The example illustrates the flow of information between sub-engines of the IP annotation system 115 and the IP database 110. To aid in explaining the example of FIG. 4, it will be described in the context of a plurality of requests that are stored in IP database 110 with request data and/or other information.

Request data engine 122 may identify one or more of a plurality of IP addresses from IP database 110. In some implementations, the IP addresses may be associated with a physical location, one or more users that are associated with the IP address, and/or other information that may be determined from request data from requests previously identified as originating from an IP address. For example, request data engine 122 may identify 10 previous requests from the IP address "111.111.111.111" in IP database 110, and request data engine 122 may further identify request data for each of the requests and/or annotations of information that was previously identified and/or determined from request data associated with the requests. Also, for example, one or more identified IP addresses may be associated with a physical address, as described herein.

Request data engine 122 may provide information to category determination engine 128 based on the identified request data associated with the requests from an IP address. In some implementations, the information may be related to the users and/or computing devices provided requests (user names, computing device type, internet connection speed, etc.). In some implementations, the information may be related to the requests, such as time of day of the requests, duration of the requests, and/or requested webpage.

In some implementations, category determination engine 128 may identify one or more categories that may be associated with a given IP address. For example, category determination engine 128 may identify one or more criteria that are indicative of an IP address being residential, criteria that are indicative of an IP address being commercial, and/or criteria that are indicative of an IP address being publicly available.

In some implementations, category determination engine 128 may determine a likelihood value for one or more categories for an IP address. For example, category determination engine 128 may determine a likelihood value that an IP address is a residential address, a likelihood value that an IP address is a commercial address, a likelihood value that an IP address is a public Wi-Fi hotspot, and/or a likelihood value that an IP address is fraudulent. For each of the categories, category determination engine 128 may determine a value based on one or more identified factors. For example, category determination engine 128 may determine a likelihood value that is indicative of likelihood of an IP address is residential based on times of requests, last names of users associated with requests, ZIP codes associated with requests, and/or one or more other factors. Category determination engine 128 may determine a likelihood score and store the likelihood score with the IP address in IP database 110. For example, category determination engine 128 may determine that an IP address is 90% likely a residential location, 10% likely a commercial IP address, 30% to be a publicly available hotspot, and 5% likely to be a fraudulent IP address.

Figure 5:
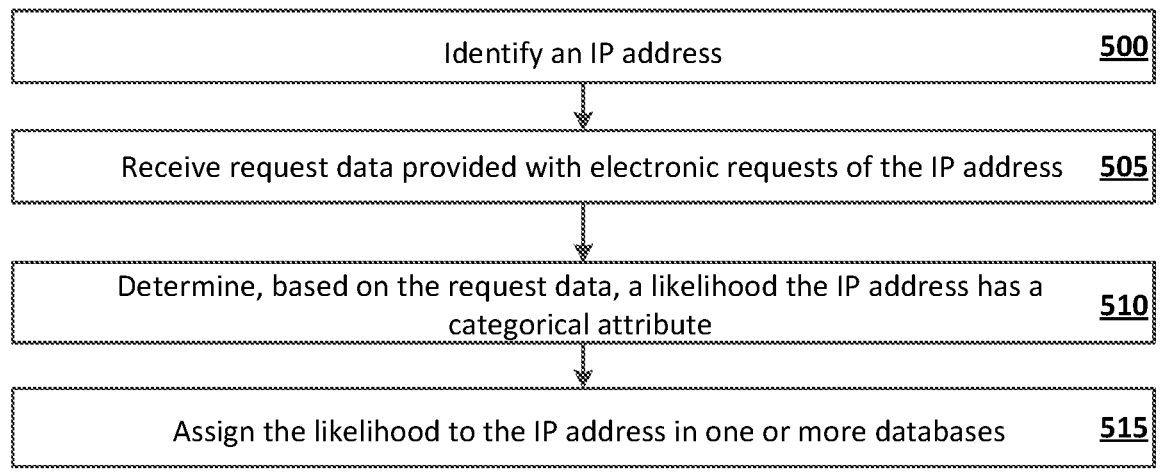
FIG. 5 is a flow chart of an example method of determining a likelihood value for an IP address category.

FIG. 5 is a flow chart of an example method of determining a likelihood value for an IP address category. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method, such as IP annotation system 115.

At step 500, an IP address is identified. The IP address may be identified by a component that shares one or more characteristics with request monitor 120 and/or may be identified via IP database 110. In some implementations, step 500 share may share one or more characteristics with step 300 of FIG. 3.

At step 505, request data that is provided with electronic requests of the IP address is received. The request data may be received by request monitor 120 and/or may be identified via IP database 110. In some implementations, step 505 may share one or more aspects with step 305 of FIG. 3.

At step 510, a likelihood that the IP address has a categorical attribute is determined. For example, category determination engine 128 may identify one or more criteria that are indicative of an IP address being residential, criteria that are indicative of an IP address being commercial, and/or criteria that are indicative of an IP address being publicly available. In some implementations, the likelihood may be determined based on request data that is associated with one or more of the identified requests from the IP address.

For example, a plurality of request for an IP address may be identified from IP database 110, each associated with request data indicating an actual name of a user. In some implementations, category determination engine 128 may determine a likelihood of the IP address being residential by determining a count of requests that include the same associated surname. For example, category determination engine 128 may identify ten requests, eight of which are associated with a surname of "Smith." Category determination engine 128 may determine a likelihood that the IP address is residential that is more indicative of likelihood than a second address that is associated with requests that indicate different last names for the requests.

At step 515, the likelihood is assigned to the IP address in one or more databases. The IP address and assigned likelihood may be stored in one or more databases, such as IP database 110. In some implementations, IP database 110 may already include an entry for the IP address, and category determination engine 128 may associate the likelihood to the existing entry. For example, category determination engine 128 may identify an entry in IP database 110 for an IP address that is assigned a likelihood for the IP address being a commercial address. Category determination engine 128 may create a new entry for the IP address and a likelihood for a second category and/or category determination engine 128 may associate the second likelihood with the existing entry.

In some implementations, IP annotation system 115 may determine a fraud score to associate with one or more IP addresses and/or netmasks. For example, fraudulent activity engine 130 may identify one or more requests originating from an IP address of "111.111.111.111," and determine a fraud score based on request data associated with the requests. For example, fraudulent activity engine 130 may determine a fraud score based on identifying previous requests that resulted in a charge-back of a credit card transaction, ad click-through rates from the IP address, and/or inconsistent physical location information between a physical location determined as described herein and location information identified from request data.

In some implementations, a fraud score that is associated with an IP address may be utilized to determine the likelihood that a future identified request is fraudulent. For example, fraudulent activity engine 130 may identify an incoming request, identify an entry in IP database 110 that matches the incoming request IP address and/or is a masked address that matches the IP address of the incoming request, and fraudulent activity engine 130 may determine whether the request is likely fraudulent based on a fraud score associated with the IP address and/or masked address in one or more databases.

In some implementations, fraudulent activity engine 130 may determine a fraud score for an IP address based on a history of charge-backs of credit cards resulting from requests from the IP address. For example, fraudulent activity engine 130 may demine a fraud score that is indicative of a fraudulent IP address if more than a threshold number of credit card transactions resulted in charge-backs. In some implementations, a fraud score may be determined for an IP address based on the type and/or volume of activity from the IP address. For example, fraudulent activity engine 130 may determine a fraud score for an IP address that is indicative of the IP address being fraudulent if a history of a threshold number of ad click-throughs is identified for the IP address.

In some implementations, a physical address may be determined for an IP address and a fraud score may be determined based on the physical address. For example, a physical address of an IP address may be determined as described herein fraudulent activity engine 130 may determine a fraud score based on the physical location. For example, fraudulent activity engine 130 may determine a fraud score for an IP address that is more indicative of likely fraud for an IP address that is associated with a region and/or network known to be the source of fraudulent internet activity than an IP address associated with a region and/or network that is not as known for fraudulent activity.

In some implementations, fraudulent activity engine 130 may determine a fraud score based on the number of different physical locations that are associated with the IP address. For example, fraudulent activity engine 130 may identify that an IP address is associated with 500 different physical locations based on previous requests originating from the IP address, and fraudulent activity engine 130 may further identify that the IP address is likely a residential address based on one or more categories associated with the IP address. Based on the residential category and the number of physical locations, fraudulent activity engine 130 may determine a fraud score that is indicative of fraud if the number of locations associated with requests from a residential location is likely fraudulent.

In some implementations, fraudulent activity engine 130 may determine whether a new request is likely fraudulent based on a determined fraud score associated with the IP address in IP database 110. For example, an incoming request from an IP address may be associated with request data that indicates a location, such as credit card payment information. Fraudulent activity engine 130 may identify the IP address in IP database 110 and further identify a physical location and a fraud score associated with the IP address. Based on similarity between the location of the request and the location associated with the IP address, and based on the fraud score, fraudulent activity engine 130 may determine a score for the request that is indicative of the fraudulent nature of the request. For example, a first IP address may be associated with a location in Indiana and a fraud score that is indicative of a low likelihood of fraud. A request from the first IP address may be associated with a location in Texas and fraudulent activity engine 130 may determine a score that is less indicative of fraud for the request from the first IP address than a second request with request data indicating a physical location of China. Also, for example, fraudulent activity engine 130 may determine a likelihood of fraud for a third request that includes Texas from an IP address that is associated with Indiana if the fraud score is more indicative of likely fraud than the fraud score associated with the first IP address. In some implementations, one or more components may determine whether and/or how to respond to a new request based on a determined likelihood that the new request is fraudulent. For example, the ad server 106 may determine not to provide campaign content to an IP address of a new request if it is determined the new request is likely fraudulent (e.g., the IP address of the new request has a fraud score that satisfies a threshold). Also, for example, for a new request the ad server 106 may determine a bid amount based on a determined likelihood that the new request is fraudulent (e.g., may bid higher if likely not fraudulent than if likely fraudulent). As yet another example, the content providing system 170 may determine whether to provide campaign content to a physical address and/or email address associated with an IP address based on a fraud score associated with the IP address.

Figure 6:
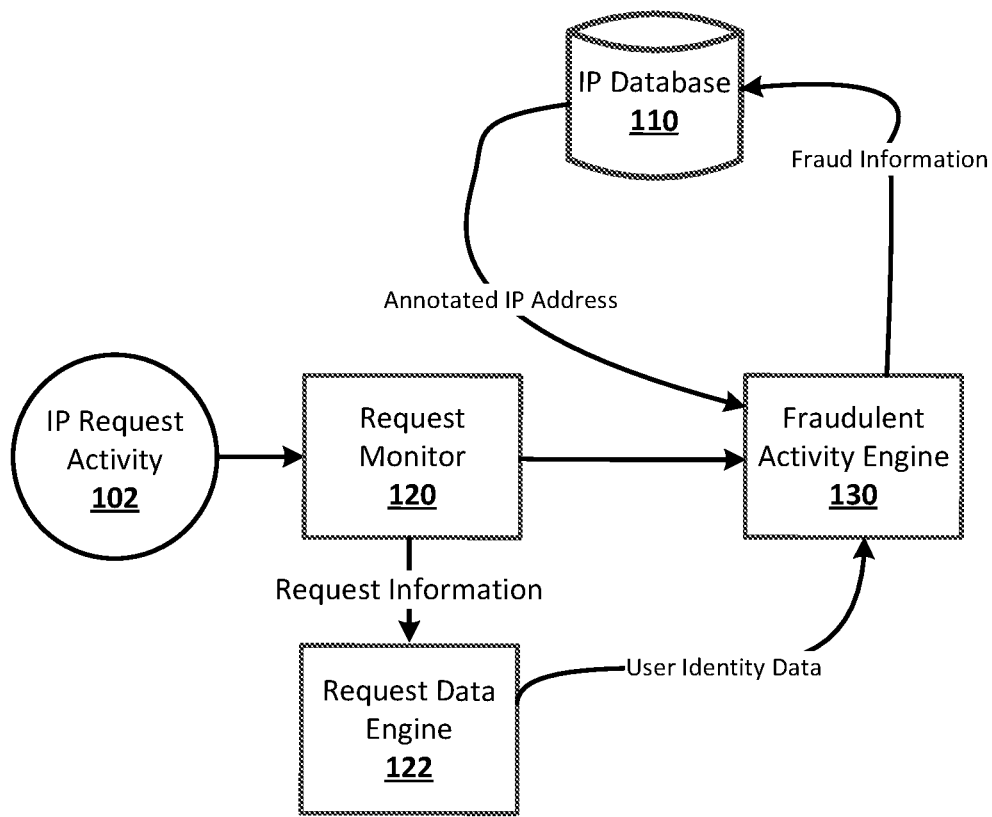
FIG. 6 illustrates an example of determining likelihood that activity from an IP address is fraudulent.

FIG. 6 illustrates an example of determining likelihood that activity from an IP address is fraudulent. Request monitor may identify an incoming request and provide request information associated with the request to request data engine 122, which may identify user identity data that is associated with the request. Request data engine 122 may provide fraudulent activity engine 130 with user information, such as name, location, computing device information related to the computing device that is providing the request, and/or other request data as described herein. Fraudulent activity engine 130 may identify an IP address in IP database 110 that is annotated with a fraud score, physical location, one or more likely categories, and/or fraud data that is indicative of past charge-backs and/or ad click-through rates. Fraudulent activity engine 130 may then determine a score for the request that is indicative of likelihood that the request is fraudulent. In some implementations, fraudulent activity engine 130 may not identify the IP address in IP database 110 and may determine fraud information and/or a fraud score for the IP address and store the IP address with the fraud score in IP database 110 for later use with other requests from the IP address.

Figure 7:
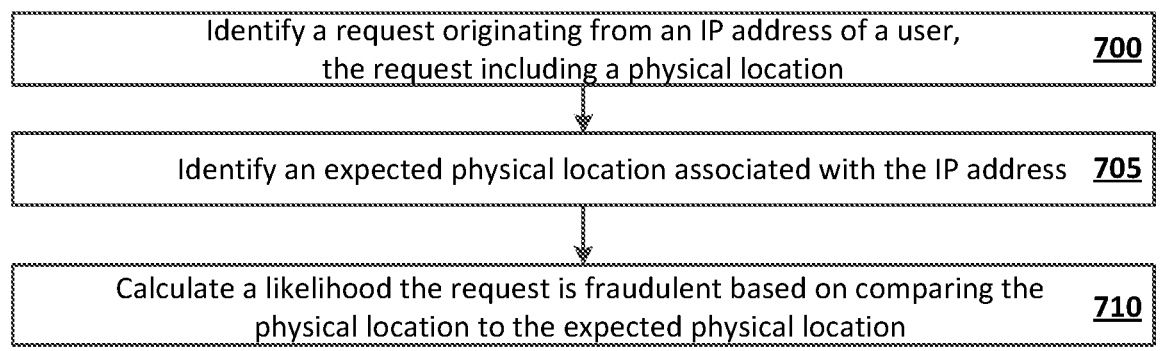
FIG. 7 is a flow chart of an example method of determining whether activity from an IP address is fraudulent.

FIG. 7 is a flow chart of an example method of determining whether activity from an IP address is fraudulent.

Other implementations may perform the steps in a different order, omit certain steps, and/or perform different and/or additional steps than those illustrated in FIG. 7. For convenience, aspects of FIG. 7 will be described with reference to one or more components of FIG. 1 that may perform the method, such as IP annotation system 115.

At step 700, a request originating from an IP address of a user is identified. The request may include a physical location. The request may be identified by a component that shares one or more characteristics with request monitor 120. The physical location may be identified based on, for example, information entered by the user, information identified based on request data provided with the request, and/or trace route information.

At step 705, an expected physical location associated with the IP address is identified. The expected location may be identified via IP database 110 by a component that shares one or more characteristics with fraudulent activity engine 130. For example, request monitor may identify a request emanating from an IP address and fraudulent activity engine 130 may identify one or more entries in IP database 110 for that IP address. Also, for example, fraudulent activity engine 130 may identify one or more masked addresses that match the IP address in masked addresses to physical locations database 145.

At step 710, a likelihood that the request is fraudulent is calculated. The likelihood may be calculated based on comparing the physical location from the IP request to the expected physical location associated with the IP address. In some implementations, the likelihood may be determined based on similarity between the physical location of the request and the expected physical location. For example, the physical location associated with a request may be "12345" and the expected location may be "12356," and fraudulent activity engine 130 may determine a likelihood based on, for example, a numerical distance between the locations, a spatial distance between locations associated with the ZIP codes, and/or one or more other methods to determine a likelihood that the differences between the locations is indicative of fraudulent activity.

Figure 8:
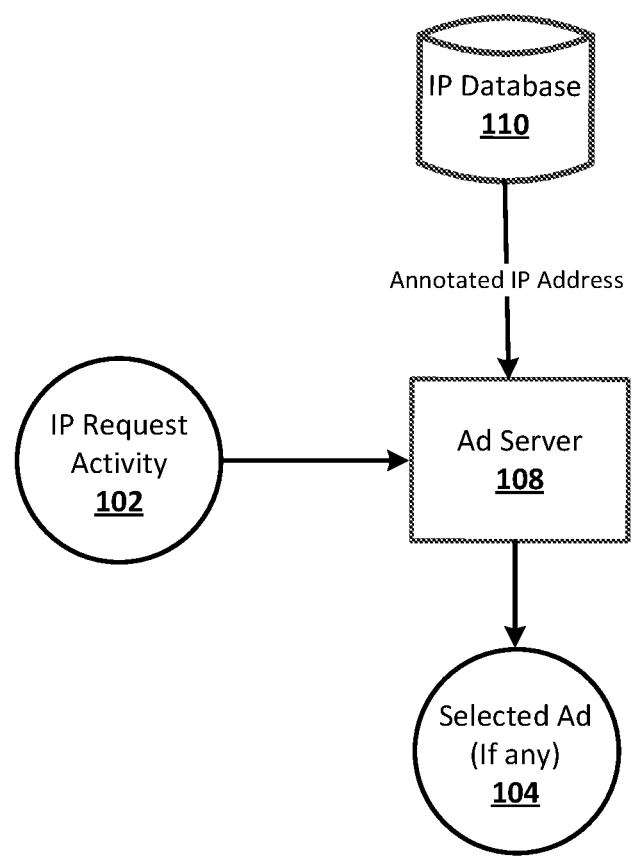
FIG. 8 illustrates an example of determining an advertisement to provide responsive to an advertisement request.

FIG. 8 illustrates an example of determining an advertisement to provide with a request. Ad server 108 may receive an IP request activity 102 from a server that is servicing web requests from computing devices. The IP request activity 102 may include an IP address of the intended target of an advertisement, and may additionally include request data as described herein. Ad server 108 may identify entries in IP database 110 based on the IP address of the IP request activity 102. In some implementations, the entries of IP database 110 may include one or more likely categories for the identified IP address, as described herein. In some implementations, ad server 108 may provide a selected ad 104 to the IP address of the IP request activity 104 and/or to the server that provided the IP request activity.

In some implementations, ad server 108 may determine which ads to provide based on information from IP database 110. For example, ad server 108 may serve ads from a plurality of advertisers, and incoming requests may be matched with appropriate ads for the request. For example, a request 102 may be provided to ad server 108 and ad server 108 may identify the IP address in IP database 110. Furthermore, ad server 108 may identify a physical location of Kentucky and a likely category of residential that are associated with the IP address in IP database 110. Ad server 108 may host ads from two advertisers: the first advertiser may have more interest in providing commercial requests with ads and/or may have interest in only providing ads to residential IP addresses in Florida; and the second advertiser may have interest in providing advertisements to the southern region of the United States. Ad server 108 may provide the advertisements of the second advertiser based on the physical address information identified in IP database 110.

Figure 9:
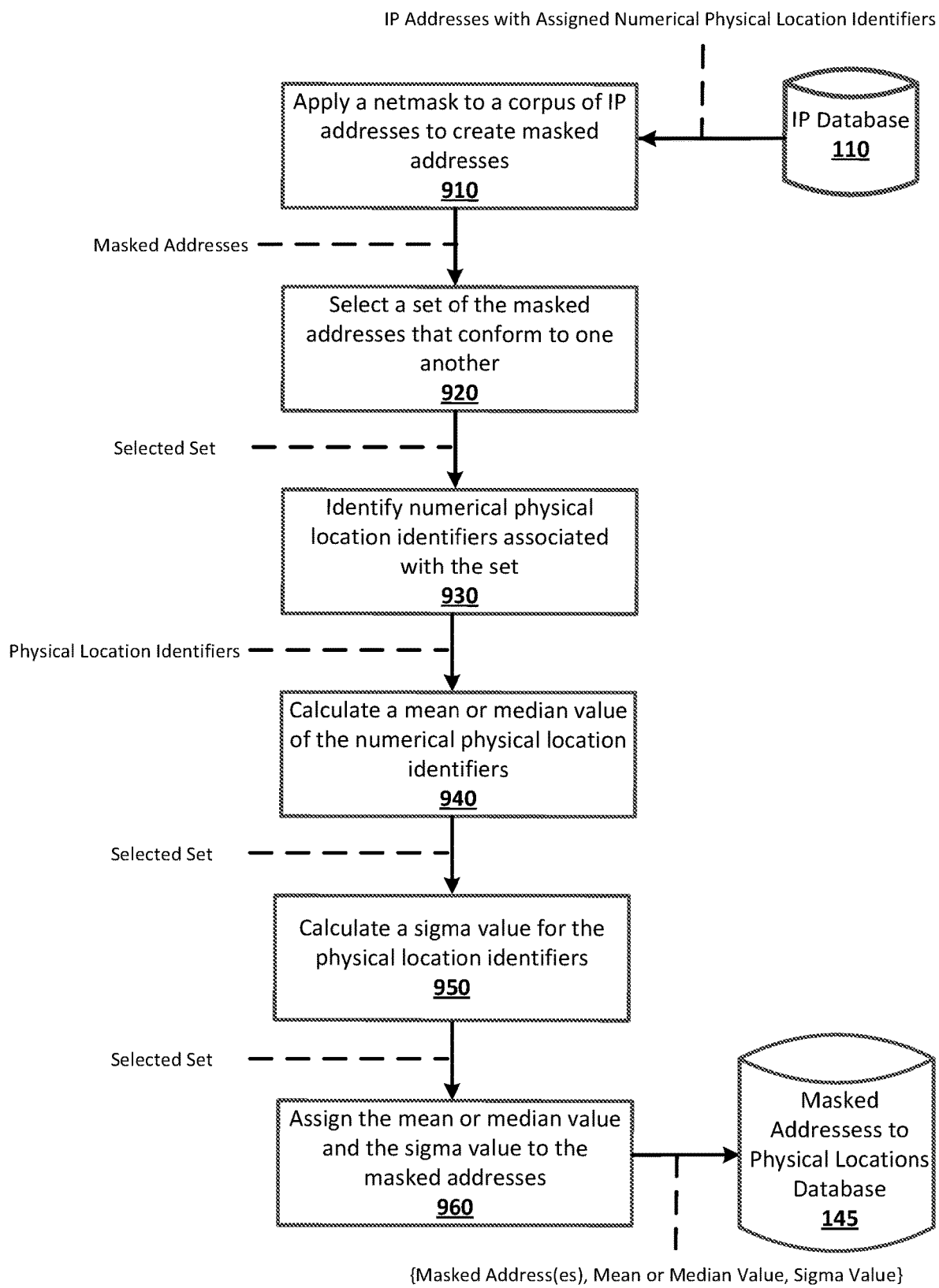
FIG. 9 illustrates an example of generating a mapping of one or more masked addresses of IP addresses to one or more indications of physical locations.

FIG. 9 illustrates an example of generating a mapping of one or more masked IP addresses to one or more indications of physical locations. Aspects of the example of FIG. 9 are described with reference to steps 910, 920, 930, 940, 950, and 960 that may be performed. One or more of the steps may be performed, for example, by the masked addresses to physical locations system 140. Other implementations may perform the steps in a different order, omit certain steps, and/or perform different and/or additional steps than those illustrated in FIG. 9.

At step 910 a netmask is applied to a corpus of IP addresses to create masked addresses. The corpus of IP addresses may be identified from IP database 110 and/or another database and may be restricted to IP addresses that are associated with assigned numerical physical location identifiers. A numerical physical location identifier may include any orderable numbering utilized in identifying a geographic location, or any other spatial ordering from which meaningful classifications may be derived. Examples of numerical physical location identifiers include ZIP codes, census tabulation areas, like tracts and blocks, voting blocks, and so forth. In some implementations, the identified corpus of IP addresses may further be restricted based on one or more criteria such as a "freshness" criteria (e.g., only IP addresses having numerical physical location identifiers assigned within the last X days), a "confidence" criteria (e.g., only IP addresses with highly confident and/or verified assigned physical location identifiers), etc.

The applied netmask may be, for example, a 24 bit netmask such as "255.255.255.0". Netmasks with fewer and/or more bits may be utilized. For example, for IPv6 IP addresses, netmasks of greater than 32 bits may be utilized. Also, as described herein, the example, of FIG. 9 may be iteratively applied to generate mappings for multiple masked IP addresses and each iteration may employ a distinct netmask.

At step 920, a set of the masked addresses that conform to one another may be selected. For example, where a netmask of "255.255.255.0" is applied, the masked addresses that conform to one another may be masked addresses that all have the same 24 bit prefix. For instance, applying a netmask to IP addresses 192.168.1.1 and 192.168.1.2 would result in a masked address of 192.168.1.0 for both. In some implementations, masked addresses that conform to one another may be selected for inclusion in the set when the quantity of the masked addresses satisfies a threshold (e.g., to achieve desired statistical significance).

At step 930, numerical physical location identifiers associated with the set are identified. For example, ZIP codes associated with the IP addresses that led to the masked addresses of the set may be identified. For instance, as described above, IP database 110 may include assigned numerical physical location identifiers for each of the IP addresses of those corpus and those assigned numerical physical location identifiers that correspond to the set may be identified.

At step 940, a mean or median value of the numerical physical location identifiers is calculated. For example, in some implementations the numerical physical location identifiers may be ordered and the median (i.e., $2^{nd}$ quartile) numerical physical location identifier utilized as the median value. The median may be used to represent a mean value, as a performance optimization.

At step 950, a sigma value for the numerical physical location identifiers is calculated. For example, in some implementations the numerical physical location identifiers may be ordered and the sigma value may be determined based on a delta between a first numerical physical location identifier that is less than the median and a second numerical physical location identifier that is greater than the median. For instance, the sigma value may be based on a delta between a first quartile numerical physical location identifier and a third quartile physical location identifier. For example, the delta between the first and third quartiles covers 50% of values, so half that delta is an offset against the median that represents the 0.625 sigma value that approximately covers 50% of values within a normal distribution. Dividing the offset by 0.625 approximates a 1 sigma offset. For example, in quartiles 90202, 90210, 90218, the median is 90210, and 50 percent of the values are covered between 90202 and 90218, or 16 code points. An offset against the median of 8 code points therefore represent a 0.625 sigma, so 1 sigma is an offset of 12.8 code points. Therefore, 90223, being roughly 1 sigma offset away from the median 90120, has a 68% likelihood of veracity. To calculate the likelihood, subtract the survival function of the sigma offset from one half to get the percentile of one side of the distribution, then double the result to get the percentile of both sides of the distribution. That is, 'second_numeral_percentile=(0.5−survival(abs(second_numeral_value−median)/sigma))*2'.

At step 960 the calculated mean or median value and the calculated sigma value may be assigned to the masked addresses. For example, masked addresses of the set are all a single value such as 192.168.1.0, that single value may be assigned the calculated mean or median value. The mean or median value and sigma value may be stored with an indication of assignment to the masked address in the masked addresses to physical locations database 145.

Multiple iterations of one or more steps in FIG. 9 may be performed in some implementations. For example, steps 930, 940, 950, and 960 may be performed multiple times for a set selected at step 920, with each iteration involving a unique type of physical location identifier. For instance, the first iteration may involve ZIP codes, whereas the second iteration may involve census block GEOID codes. Also, for example, steps 920, 930, 940, 950, and 960 may be performed multiple times, with each iteration involving a unique set of masked addresses. For instance, the first iteration may involve a set of addresses that are all a single value such as 192.168.1.0 and the second iteration may involve a set of addresses that are all a separate single value such as 199.199.199.0. As yet another example, steps 910, 920, 930, 940, 950, and 960 may be performed multiple times, with each iteration involving a unique netmask. For instance, the first iteration may involve a 24 bit netmask and the second iteration may involve a 25 bit netmask. Through multiple iterations of the example illustrated in FIG. 9, a mapping of masked IP addresses to one or more indications of physical locations that is of a desired breadth may be achieved.

As described, a mapping generated based on the example of FIG. 9 may be utilized in various techniques described herein. For example, in some implementations the veracity of one or more aspects of a determined physical location for an IP address may be determined based on the mapping of one or more masked addresses of the IP address to the indication of the physical location. For instance, the indication of the physical location may include a mean or median ZIP code mapped to a masked address of the IP address, and a deviation value for the mean or median ZIP code. The veracity of a ZIP code of the determined physical location may be determined based on comparison of that ZIP code to the mean or median ZIP code and/or the deviation value for the mean or median ZIP code.

Figure 10:
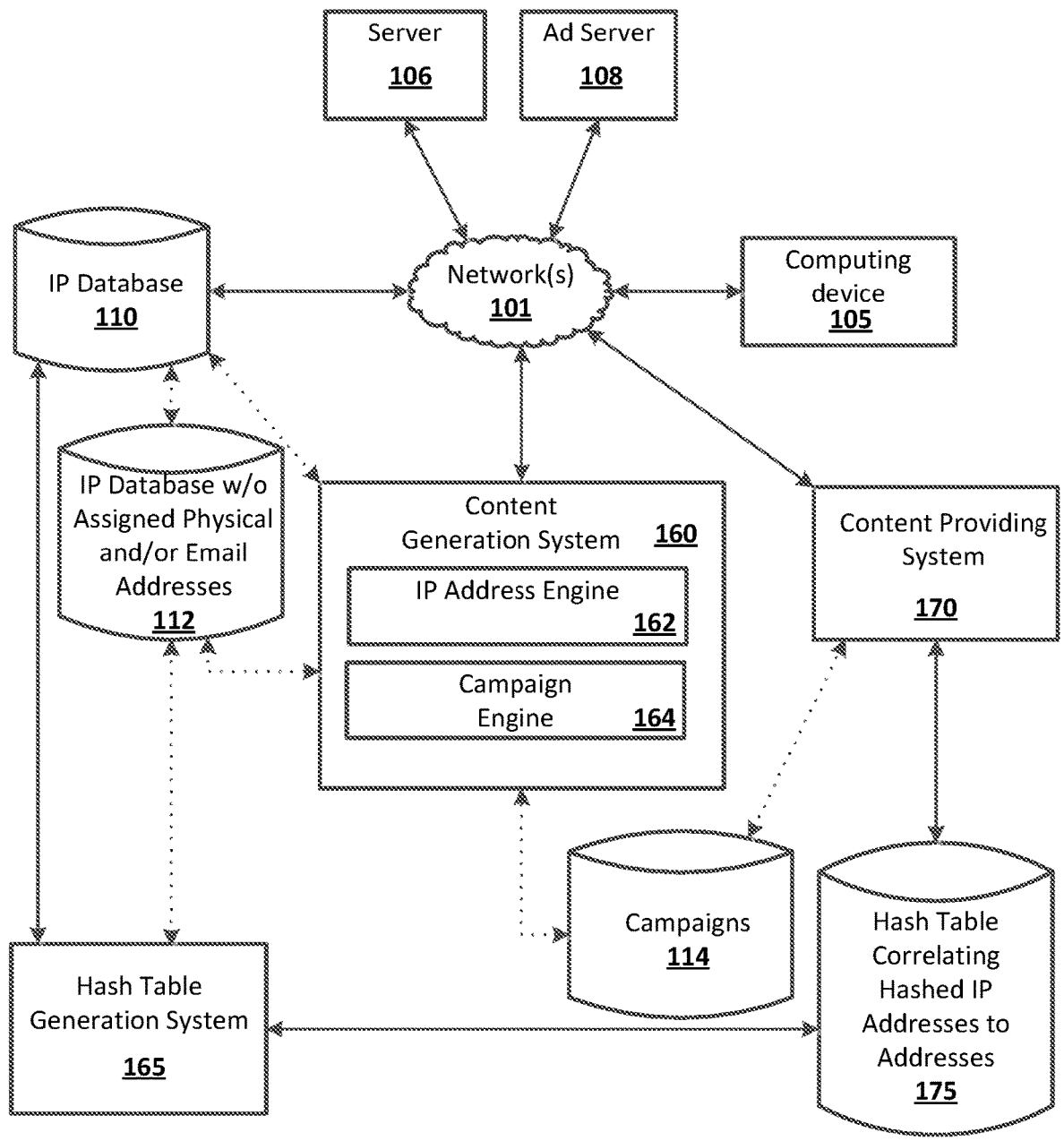
FIG. 10 illustrates an example environment in which an IP address associated with a visit to an electronic resource and/or an electronic submission of a search may be captured, content may be generated based on the captured IP address, and/or in which mail and/or email directed to a campaign may be generated based on the content.

FIG. 10 illustrates an example environment in which an IP address associated with a search and/or a visit to an electronic resource may be captured and/or in which the IP address and content associated with the search and/or the visit may be utilized to generate and/or provide campaign content. The example environment of FIG. 10 includes the network 101, the computing device 105, the server 106, the ad server 108, and the IP database 110 of FIG. 1. The example environment of FIG. 10 also includes a content generation system 160, a content providing system 170, a hash table generation system 165, an IP database without assigned physical and/or email addresses 112, a campaigns database 114, and a hash table 175 correlating hashed IP addresses to addresses (physical addresses and/or email addresses). The hash table 175 and databases 110, 112, and 114 may be stored on one or more non-transitory computer readable media.

The servers 106 and 108, the systems 160, 165, and 170, and/or other components of the example environment may be implemented in one or more computer systems that communicate, for example, through one or more networks. The content generation system 160, the hash table generation system 165, and/or the content providing system 170 are example systems in which the systems, components, and techniques described herein may be implemented and/or with which systems, components, and techniques described herein may interface. One or more aspects of the systems 160, 165, and/or 170 may be incorporated in a single computer system in some implementations. Also, in some implementations one or more components of systems 160, 165, and/or 170 and/or other components may be incorporated on the server 106 and/or the server 108.

In various implementations the content generation system 160 may include an IP address engine 162 and a campaign engine 164. In some implementations, all or aspects of engines 162 or 164 may be omitted, combined, and/or implemented in a component that is separate from the content generation system 160.

In some implementations, the content generation system 160 receives, from one or more components (e.g., server 106, ad server 108, and/or computing device 105) captured IP addresses associated with retrieval, by computing devices having those captured IP addresses, of electronic content that is hosted by those servers and that comprises part or all of the electronic content of corresponding electronic resources. In some of those implementations, the content generation system 160 further receives, in conjunction with the captured IP addresses, identifiers of the corresponding electronic resources. As used herein, an electronic resource includes, for example, a webpage, an electronic advertisement, all or subsets of an electronic application (e.g., a mobile phone "app"), etc.

As one example, assume server 106 hosts a webpage and that computing device 105 retrieves the webpage from the server 106. The server 106 may capture the IP address of the computing device 105 and provide the captured IP address and an identifier of the webpage to the content generation system 160. The identifier of the webpage may be, for example, a uniform resource locator (URL) of the webpage, another unique identifier of the webpage, an identifier of a group of webpages that includes the webpage (e.g., a subdomain), etc.

As another example, assume server 106 hosts a pixel or other web beacon that is incorporated in one or more webpages or other electronic resource(s) and that computing device 105 retrieves the pixel from the server 106 along with other content of one of the electronic resource(s) in which the pixel is incorporated (the other content may be retrieved from the server 106 and/or additional server(s)). The server 106 may capture the IP address of the computing device 105 and provide the captured IP address and an identifier of the retrieved electronic resource to the content generation system 160. The identifier of the retrieved electronic resource may be, for example, an identifier of the pixel and/or an identifier of the electronic resource(s) in which the pixel is incorporated.

As yet another example, assume ad server 108 hosts one or more electronic advertisements and that computing device 105 retrieves one of the electronic advertisements from the ad server 108. The ad server 108 may capture the IP address of the computing device 105 and provide the captured IP address and an identifier of the retrieved electronic advertisement to the content generation system 160.

In some implementations, the content generation system 160 receives, from one or more components (e.g., server 106, ad server 108, and/or computing device 105) captured IP addresses associated with electronic submissions of searches by computing devices having those captured IP addresses. In some of those implementations, the content generation system 160 further receives, in conjunction with the captured IP addresses, search content associated with the searches, where the search content indicates content included in the searches and/or content provided in response to the searches. As one example, the server 106 may host a search engine that receives and acts upon searches submitted by the computing device 105 and/or other computing devices, and/or the server 106 may provide IP addresses and search content associated with such searches. As another example, the server 106 may be one or more servers of an Internet service provider and may provide IP addresses and search content associated with submitted searches routed through the one or more servers. As yet another example, the computing device 105 and/or other computing devices may include one or more applications that provide IP addresses and search content associated with searches submitted by those computing devices.

The captured IP addresses and search content received by the content generation system 160 may take various forms. For example, the search content may include particular searches submitted and those particular searches may be mapped to the IP addresses that submitted the particular searches. For instance, the search content may indicate a search of "health insurance providers" that is mapped to multiple IP addresses that submitted a search of "health insurance providers". Also, for example, the search content may include a category or other generalization of searches and the generalization may be mapped to the IP addresses that submitted searches having that generalization. For instance, the search content may indicate a category of "health insurance" searches that is mapped to multiple IP addresses that submitted the searches of the category. The category of "health insurance" searches may encompass a plurality of searches such as "health insurance provides", "health plans", "health insurance companies", "insurance rates—health", etc.

Many examples provided herein are described with respect to IP addresses. For example, some of the above examples describe the content generation system 160 receiving IP addresses associated with retrievals of electronic content and/or searches. However, in some implementations other source identifiers are additionally and/or alternatively utilized. For example, the content generation system 160 may receive search content that is mapped to other source identifiers. Other source identifiers may include, for example, User IDs (e.g., IDs used in a sign-in to an Internet service), Device IDs (e.g., MAC address and/or other identifier of computing devices), and/or Cookie IDs. In some implementations, the IP database 110 and/or another database may include direct or indirect associations of the other source identifiers to corresponding IP addresses, email addresses, physical addresses, and/or other data described herein. For example, as described herein the IP database 110 may be generated based at least in part on request data and/or additional information. Such request data and/or additional information may include other source identifiers, email addresses, and/or physical addresses, and may be correspondingly associated with IP addresses and/or each other in the IP database 110. For example, a given IP address may be mapped in the IP database 110 to one or more User Ids, Device IDs, Cookie IDs, email addresses, and/or physical addresses based on such mapped data being included in request data for the given IP address and/or associated with the IP address in additional information.

In some implementations, the content generation system 160 utilizes received captured IP addresses and identifiers of corresponding electronic resources and/or search content to generate postal content to provide to content providing system 170. Generally, postal content provided by content generation system 160 enables creation, by content providing system 170, of mail (e.g., direct marketing mail) that are each addressed to a physical address that corresponds to a captured IP address and that are tailored to a postal campaign mapped to the electronic resource and/or the search content associated with the captured IP address.

In some implementations, the content generation system 160 additionally and/or alternatively utilizes received captured IP addresses and identifiers of corresponding electronic resources and/or search content to generate email content to provide to content providing system 170. Generally, email content provided by content generation system 160 enables creation, by content providing system 170, of emails that are each addressed to an email address that corresponds to a captured IP address and that are each tailored to a postal campaign mapped to the electronic resource and/or the search content associated with the captured IP address.

In some implementations, the content generation system 160 additionally and/or alternatively utilizes received captured IP addresses and identifiers of corresponding electronic resources and/or search content to generate digital content to provide to content providing system 170. Generally, digital content provided by content generation system 160 enables creation, by content providing system 170, of a digital ad campaign that provides digital ads in response to visits to resources (e.g., webpages, applications) by computing devices having a captured IP address, where the digital ads are tailored to a campaign mapped to the electronic resource and/or the search content associated with the captured IP address.

The content providing system 160 may utilize various techniques to generate postal content, email content, and/or digital content. Additional description of some of these techniques, as well as additional description of other components of FIG. 10, is now provided with reference to FIGS. 11-14. Each of FIGS. 11-14 illustrates an example of capturing an IP address associated with a visit to an electronic resource and/or an electronic submission of a search, generating postal content and/or email content based on the captured IP address, and providing the content for generation of mail and/or emails directed to a campaign.

Figure 11:
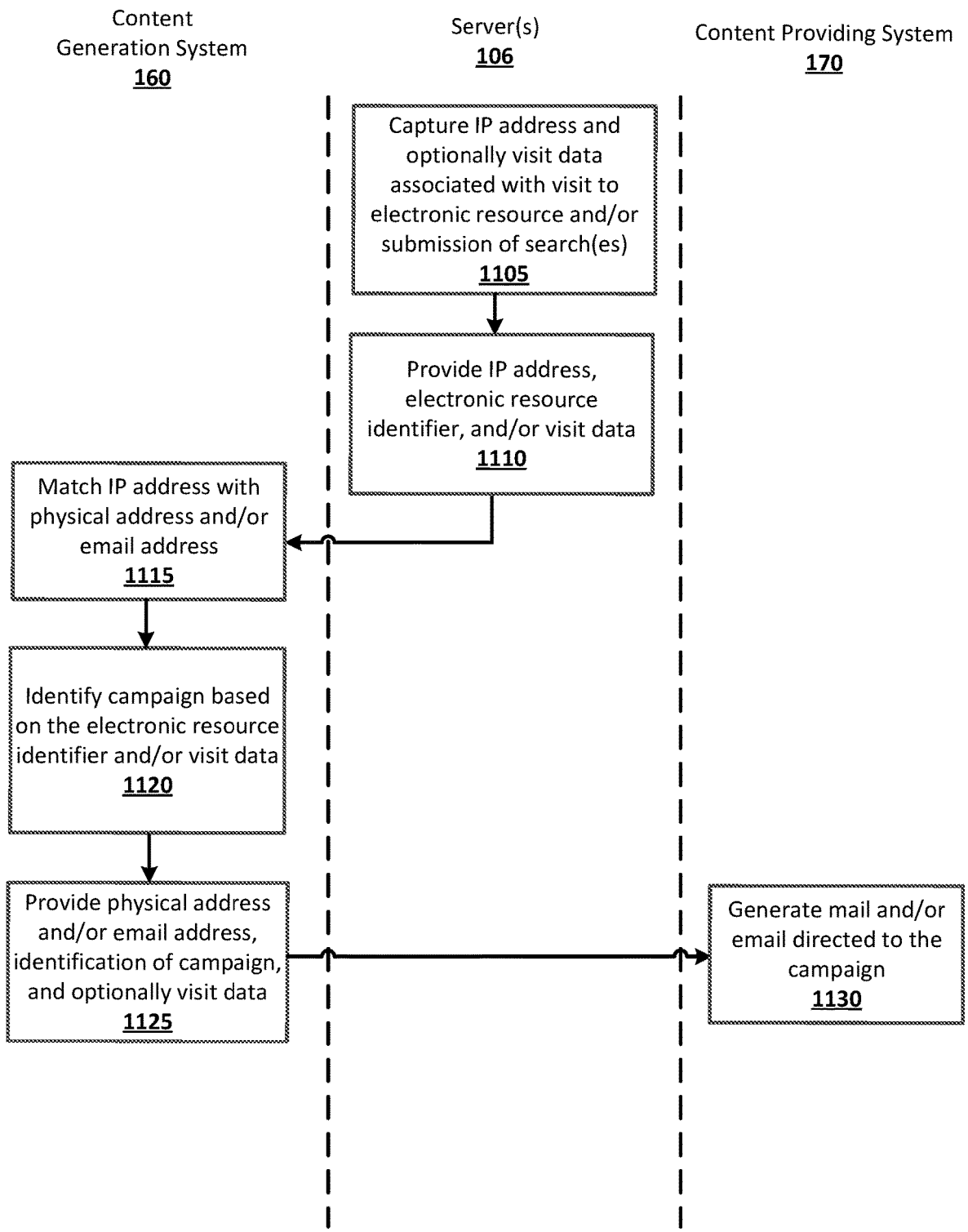
FIG. 11 illustrates an example of capturing an IP address associated with a visit to an electronic resource and/or an electronic submission of a search, generating content based on the captured IP address, and providing the content for generation of mail and/or email directed to a campaign.

Turning first to FIG. 11, at block 1105 server 106 captures an IP address associated with a visit to an electronic resource and/or submission of one or more searches. At block 1105, server 106 may also optionally capture visit data associated with the visit to the electronic resource and/or associated with search content of the one or more searches.

As one example, at block 1105 server 106 may host a webpage and a computing device may retrieve the webpage from the server 106. The server 106 may capture the IP address of the computing device and provide the IP address and associated visit data at block 1105. The visit data may include, for example, one or more Urchin Tracking Module (UTM) codes associated with the visit, a click path (one or more hyperlinks followed to arrive at the electronic resource and/or followed after arriving at the electronic resource) associated with the visit, and/or other visit data that provides context to the visit to the electronic resource.

As another example, at block 1105 server 106 may host a search engine that receives and acts upon a search submitted by a computing device 105. The server 106 may capture the IP address of the computing device and provide the IP address and associated search content at block 1105. The provided search content may indicate content included in the search and/or content provided in response to the search.

At block 1110, the server 106 provides the IP address, an electronic resource identifier, and/or the visit data to the content generation system 160. For example, for a visit to an electronic resource the server 106 may transmit the IP address, electronic resource identifier, and the visit data to the content generation system 160 via the network 101 and an application programming interface (API) of the content generation system 160. Various electronic resource identifiers may be utilized such as, for example, a URL or other unique identifier of the electronic resource, an identifier of a group of electronic resources that include the electronic resource (e.g., an identifier of a group of electronic resources included in a postal campaign, an identifier of a subdomain), an identifier of a pixel or other web beacon that is associated with one or more electronic resources, etc. Also, for example, for a search submitted to the server 106 by a computing device, the server 106 may transmit the IP address of the computing device and visit data that includes search content (e.g., that indicates content included in the search and/or content provided in response to the search).

As one particular example of blocks 1105 and 1110, assume server 106 hosts a pixel or other web beacon that is incorporated in one or more webpages or other electronic resource(s) and that computing device 105 retrieves the pixel from the server 106 along with other content of one of the electronic resource(s) in which the pixel is incorporated. The server 106 may capture the IP address of the computing device 105 and provide the captured IP address and an identifier of the retrieved electronic resource to the content generation system 160.

At block 1115, the content generation system 160 (e.g., the IP address engine 162) receives the data provided by server 106 at block 1110, and matches the IP address with a physical address and/or email address that is assigned to that IP address in one or more databases. For example, as illustrated in FIG. 10, the content generation system 160 may be in communication with the IP database 110. The content generation system 160 may identify the IP address in the database 110 and use a physical address assigned to that IP address in the database 110 as the matched physical address and/or use an email address assigned to the IP address in the database 110 as the matched email address. As described herein, the IP database 110 may store a plurality of IP addresses and associations of those IP addresses to corresponding physical addresses and/or email addresses. For example, a given IP address may be assigned to a street address, city, state, ZIP code, name, and/or email address in the IP database 110.

At block 1120, the content generation system 160 (e.g., the campaign engine 164) identifies a campaign based on the electronic resource identifier and/or based on the visit data. For example, as illustrated in FIG. 10, the content generation system 160 may be in communication with campaigns database 114 and may identify the campaign based on a mapping between the electronic resource identifier and the campaign in campaigns database 114. The campaigns database 114 may store mappings between electronic resource identifiers and campaigns. For example, campaigns database 114 may store a mapping between Webpage A and Postal Campaign X. Also, for example, campaigns database 114 may store a mapping between Search Content A and Postal Campaign X. Postal Campaign X may be stored in the campaigns database 114 as a unique identifier of a postal campaign and/or as one or more aspects of particular content that will be included in mail generated based on the postal campaign. As another example, campaigns database 114 may store a mapping between Email Campaign X and Search Content A and/or Webpage A.

In some implementations, the campaigns database 114 may store, for each of one or more of the campaigns, additional criteria for the campaign. In some of those implementations, the content generation system 160 (e.g., the campaign engine 164) may additionally and/or alternatively identify the campaign based on comparing the additional criteria to the visit data and/or to attributes associated with the IP address in IP database 110.

Some examples are now provided with respect to a captured IP address associated with a visit to an electronic resource and associated visit data. As one example, a postal and/or email campaign may be mapped in campaigns database 114 to a particular electronic resource and to one or more particular values for UTM codes—and that postal and/or email campaign identified for a given IP address only when an electronic resource identifier received in conjunction with the given IP address matches the particular electronic resource and when the additional visit data received in conjunction with the given IP address includes the particular values for the UTM codes. As another example, a postal and/or email campaign may be mapped in campaigns database 114 to a particular electronic resource and to one or more particular click paths—and that postal and/or email campaign identified for a given IP address only when an electronic resource identifier received in conjunction with the given IP address matches the particular electronic resource and when the additional visit data received in conjunction with the given IP address indicates one of the particular click paths. As yet another example, a postal and/or email campaign may be mapped in campaigns database 114 to a particular electronic resource and to one or more additional attributes associated with an IP address, such as a residential likelihood (as described above) satisfying a threshold—and that postal and/or email campaign identified for a given IP address only when an electronic resource identifier received in conjunction with the given IP address matches the particular electronic resource and when the IP database 110 includes the one or more additional attributes assigned to the given IP address. As yet another example, a postal and/or email campaign may be mapped in campaigns database 114 to a particular electronic resource and to one or more geographic areas—and that postal and/or email campaign identified for a given IP address only when an electronic resource identifier received in conjunction with the given IP address matches the particular electronic resource and when the IP database 110 includes a physical address that is in the one or more geographic areas and that is assigned to the given IP address.

Some examples are now provided with respect to a captured IP address associated with a submission of a search and associated visit data. As one example, a postal and/or email campaign may be mapped in campaigns database 114 to particular search content and to one or more particular values for UTM codes and/or other traffic identification codes—and that postal and/or email campaign identified for a given IP address only when the particular search content is indicated in the visit data and when the visit data received in conjunction with the given IP address includes the particular values for the UTM codes. As another example, a postal and/or email campaign may be mapped in campaigns database 114 to particular search content and to one or more additional attributes associated with an IP address, such as a residential likelihood (as described above) satisfying a threshold—and that postal and/or email campaign identified for a given IP address only when the particular search content is indicated in the visit data and when the IP database 110 includes the one or more additional attributes assigned to the given IP address. As yet another example, a postal and/or email campaign may be mapped in campaigns database 114 to a particular electronic resource and to one or more geographic areas—and that postal and/or email campaign identified for a given IP address only when the particular search content is indicated in the visit data and when the IP database 110 includes a physical address that is in the one or more geographic areas and that is assigned to the given IP address.

At block 1125, the content generation system 160 (e.g., the campaign engine 164) provides the physical address and/or the email address, the identification of the campaign, and optionally the visit data to the content providing system 170. For example, the content generation system 160 may transmit the physical address and/or email address, the identification of the campaign, and optionally the visit data to the content providing system 170 via the network 101 and an application programming interface (API) of the content providing system 170.

At block 1130, the content providing system 170 receives the data provided at block 1125 and generates mail and/or email directed to a campaign based on that data. For example, where the data provided at block 1125 includes the physical address and the identification of a postal campaign, the content providing system 170 may utilize the received identification of the postal campaign to generate mail directed to the campaign and may include the received physical address as an address of the mail. The non-address content of the mail may be generated based on data retrieved by the content providing system 170 from campaigns database 114 (identified using the received identifier of the postal campaign) and/or generated based on data included at block 1125 (e.g., when the data includes non-address marketing content of the postal campaign). As another example, where the data provided at block 1125 also includes the visit data, the content providing system 170 may utilize the visit data to tailor non-address content of the mail to the visit data. For instance, if the visit data indicates one of a plurality of electronic resources and/or search contents assigned to a postal campaign, the content providing system 170 may include non-address content in the mail that is particularized to that electronic resource and/or to that particular search content. Also, for instance, if the visit data indicates one or more search terms associated with a visit to an electronic resource, the content providing system 170 may include non-address content in the mail that is particularized to those search terms.

As another example, where the data provided at block 1125 includes the email address and the identification of an email campaign, the content providing system 170 may utilize the received identification of the email campaign to generate and/or transmit email directed to the campaign and may include the received email address as a recipient address of the email. In some implementations, at block 1125 the content providing system 170 may provide additional physical addresses and/or email addresses and indicate them as associated with the campaign, where those additional physical addresses and/or email addresses are not included in those matched at block 1115. In some of those implementations, this may protect privacy of users visiting the resources and/or submitting the searches targeted to the campaign since the data provided at block 1125 will include physical addresses and/or email addresses of both: users that visited the resources and/or submitted the searches associated with the campaign; and users that did not visit the resources and/or submit the searches associated with the campaign.

Although FIG. 11 is described with respect to a single IP address associated with a visit to a single electronic resource and/or submission of a single search, it is understood that one or more of blocks 1105-1130 are typically performed with additional IP addresses, additional electronic resources, and/or additional search submissions. For example, each of blocks 1105-1130 may be performed for each of a plurality of additional IP addresses, electronic resources, and/or search submissions. Also, for example, one or more of blocks 1105-1130 may be performed in association with multiple IP addresses and/or associated data. For instance, in some implementations block 1125 includes providing a plurality of physical addresses and/or email addresses associated with a postal campaign and may optionally be performed only when the number of physical addresses and/or email addresses satisfies a privacy threshold. Also, for instance, in some implementations block 1110 includes providing a plurality of IP addresses associated with a plurality of visits to the same electronic resource and/or a plurality of submissions of searches having the same search content.

Figure 12:
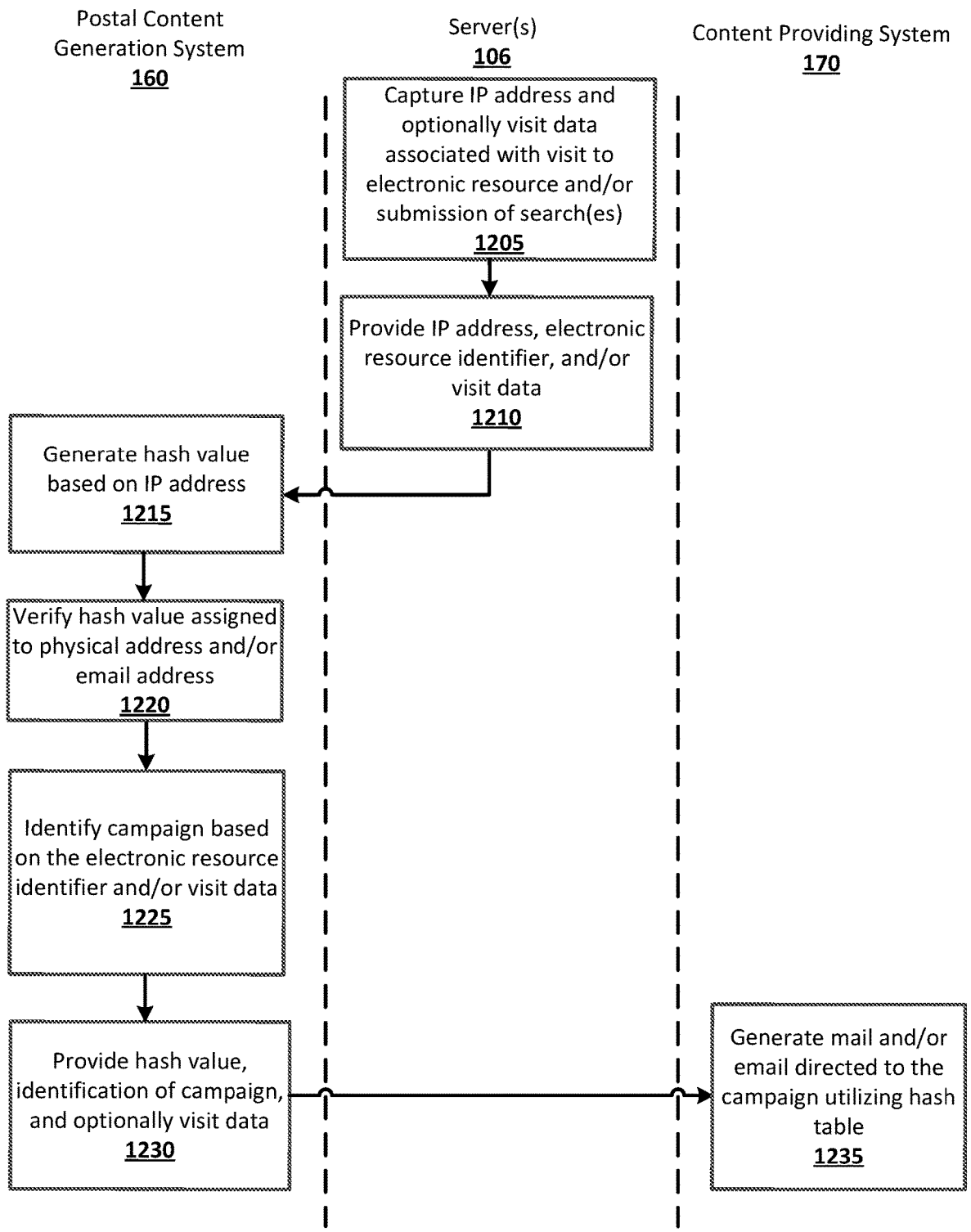
FIG. 12 illustrates another example of capturing an IP address associated with a visit to an electronic resource and/or an electronic submission of a search, generating content based on the captured IP address, and providing the content for generation of mail and/or email directed to a campaign.

FIG. 12 illustrates another example of capturing an IP address associated with a visit to an electronic resource and/or an electronic submission of a search, generating postal and/or email content based on the captured IP address, and providing the content for generation of mail and/or emails directed to a campaign.

At block 1205 server 106 captures an IP address, and optionally visit data, associated with a visit to an electronic resource and/or submission of one or more searches. At block 1210, the server 106 provides the IP address, the electronic resource identifier, and/or the visit data to the content generation system 160. In some implementations, blocks 1205 and 1210 share one or more (e.g., all) aspects in common with blocks 1105 and 1110 of FIG. 11.

At block 1215, the content generation system 160 (e.g., the IP address engine 162) receives the data provided by server 106 at block 1210, and generates a hash value based on the IP address. For example, the content generation system 160 may apply a hash function to the IP address to generate the hash value. Various hash functions may be utilized, such as a Secure Hash Algorithm (SHA) or other cryptographic and/or collision resistant hash function.

At block 1220, the content generation system 160 (e.g., the IP address engine 162) verifies the hash value is assigned to a physical address and/or email address. For example, as illustrated in FIG. 10, the content generation system 160 may be in communication with the IP database without assigned physical and/or email addresses 112 and may verify the hash value is assigned to a physical address and/or email based on matching the hash value to a hash value in the IP database without assigned physical and/or email addresses 112. The IP database without assigned physical and/or email addresses 112 includes indications of IP addresses that are assigned to physical addresses and/or email addresses, but does not actually include those particular physical addresses and/or email addresses. For example, the IP database without assigned physical and/or email addresses 112 may include a listing of IP addresses that are assigned to physical addresses and/or email addresses and/or hash values corresponding to IP addresses that are assigned to physical addresses and/or email addresses, but not actually include those physical addresses and/or email addresses. In some implementations, the hash table generation system 165 may generate the IP database without assigned physical and/or email addresses 112 by generating hash values based on those IP addresses of IP database 110 that are assigned physical addresses and/or email, and storing those hash values in the IP database without assigned physical and/or email addresses 112, without storing the physical addresses and/or email themselves in the IP database without assigned physical and/or email addresses 112. In some of those implementations, the hash table generation system 165 may optionally store additional attributes with the hash values in the IP database without assigned physical and/or email addresses 112. For example, one or more of the categories assigned to an IP address in IP database 110 may be assigned to its hash value in the IP database without assigned physical and/or email addresses 112. Also, for example, a census block or ZIP code assigned to an IP address in IP database 110 may be assigned to its hash value in the IP database without assigned physical and/or email addresses 112, without assigning the full physical address to its hash value. In some implementations, blocks 1225 and/or 1230 (described below) may be performed only if the content generation system 160 verifies the hash value is assigned to a physical address and/or email address at block 1220.

At block 1225, the content generation system 160 (e.g., the campaign engine 164) identifies a campaign based on the electronic resource identifier and/or the visit data. For example, as illustrated in FIG. 10, the content generation system 160 may be in communication with campaigns database 114 and may identify the campaign based on a mapping between the electronic resource identifier and the campaign in campaigns database 114. Also, for example, the content generation system 160 may identify the campaign based on a mapping between search content of the visit data and the campaign in campaigns database 114. In some implementations, block 1225 shares one or more (e.g., all) aspects in common with block 1120 of FIG. 11.

At block 1230, the content generation system 160 provides the hash value, the identification of the campaign, and optionally the visit data to the content providing system 170. For example, the content generation system 160 may transmit the hash value, the identification of the campaign, and optionally the visit data to the content providing system 170 via the network 101 and an application programming interface (API) of the content providing system 170. As described below with respect to block 1235, the hash value does not directly identify the physical address and/or email address but, rather, is mapped to the physical address and/or email address.

At block 1235, the content providing system 170 receives the data provided at block 1230 and generates mail and/or email directed to a campaign based on that data and utilizing a hash table, such as hash table 175 of FIG. 10. The hash table is utilized by the content providing system 170 to determine a physical address and/or email address based on the hash value. For example, the hash table 175 may include a plurality of hash values, with each of the hash values being mapped to a corresponding physical address and/or email address. In some implementations, the hash table generation system 165 may generate the hash table 175 by generating hash values based on those IP addresses of IP database 110 that are assigned physical addresses and/or email addresses, and storing those hash values in the hash table 175 along with their assigned physical addresses and/or email address. In other words, the hash table 175 may include a mapping of hash values of IP addresses with each of those hash values being mapped to a corresponding physical address and/or email address. The hash table generation system 165 may generate the hash values utilizing the same hash function as that utilized in block 1220 (e.g., a cryptographic and/or collision resistant hash function). In some implementations, the hash table 175 may be stored remote from the content generation system 160. For example, the hash table 175 may be stored locally at the content providing system 170 or on another remote server accessible by the content providing system 170.

In some implementations, the content providing system 170 may utilize the received identification of the postal campaign to generate mail directed to the campaign and may include, on the mail, the physical address determined utilizing the hash table 175. The non-address content of the mail may be generated based on data retrieved by the content providing system 170 from campaigns database 114 and/or data included at block 1230. Where the data provided at block 1235 also includes the visit data, the content providing system 170 may utilize the visit data to tailor non-address content of the mail to the visit data. For instance, if the visit data indicates one of a plurality of electronic resources assigned to a postal campaign, the content providing system 170 may include non-address content in the mail that is particularized to that electronic resource.

In some implementations, the content providing system 170 may utilize the received identification of the postal campaign to generate an email directed to the campaign and may include, as a recipient of the email, the email address determined utilizing the hash table 175. The non-address content of the email may be generated based on data retrieved by the content providing system 170 from campaigns database 114 and/or data included at block 1230. Where the data provided at block 1235 also includes the visit data, the content providing system 170 may utilize the visit data to tailor non-address content of the email to the visit data.

In implementations where the content generation system 160 and/or the content providing system 170 are implemented on different hardware resources and/or controlled by different entities, the example of FIG. 12 may potentially provide one or more benefits related to security of personally identifiable information in one or more computer systems and/or in transmissions between one or more computer systems. For example, the content generation system 160 performs blocks 1215-1230 without directly mapping the physical address and/or email address to an electronic resource and/or to a particular search. Also, for example, the data provided to content providing system 170 at block 1230 does not directly map the physical address and/or email address to an electronic resource and/or to a particular search. Also, for example, the data provided to content providing system 170 at block 1230 enables mapping, by the content providing system 170, of a campaign to a physical address and/or email address, but does not enable mapping of a particular electronic resource and/or particular search to the physical address and/or email address.

Although FIG. 12 is described with respect to a single IP address associated with a visit to a single electronic resource and/or submission of a single search, it is understood that one or more of blocks 1205-1235 are typically performed with additional IP addresses, additional electronic resources, and/or additional search submissions. For example, each of blocks 1205-1235 may be performed for each of a plurality of additional IP addresses, electronic resources, and/or search submissions. Also, for example, one or more of blocks 1205-1235 may be performed in association with multiple IP addresses and/or associated data. For instance, in some implementations block 1230 includes providing a plurality of hash values associated with a campaign and may optionally be performed only when the number of hash values satisfies a privacy threshold. Also, for instance, in some implementations block 1210 includes providing a plurality of IP addresses associated with a plurality of visits to the same electronic resource and/or providing a plurality of submissions of searches having the same search content.

Figure 13:
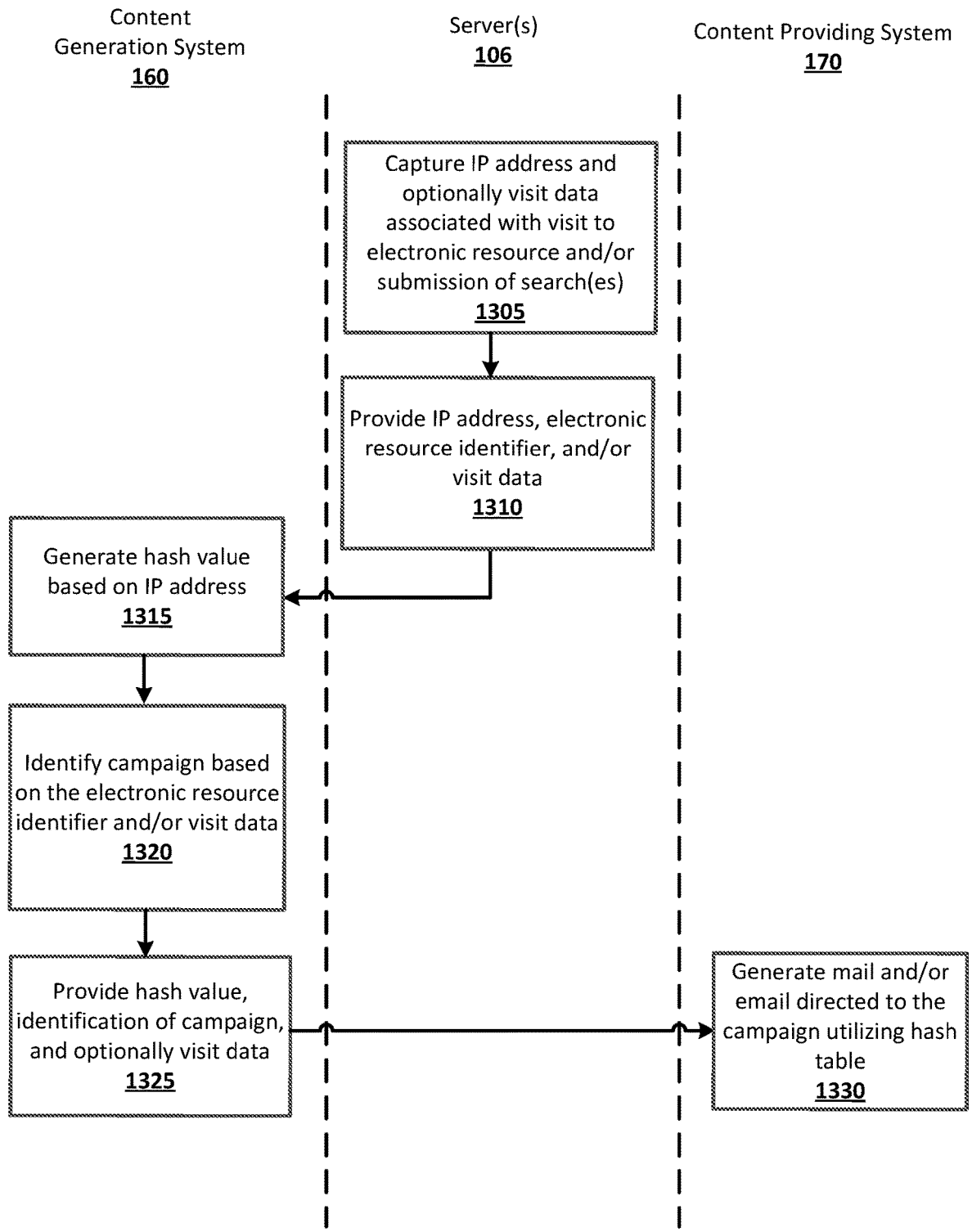
FIG. 13 illustrates yet another example of capturing an IP address associated with a visit to an electronic resource and/or an electronic submission of a search, generating content based on the captured IP address, and providing the content for generation of mail and/or email directed to a campaign.

FIG. 13 illustrates yet another example of capturing an IP address associated with a visit to an electronic resource and/or an electronic submission of a search, generating postal and/or email content based on the captured IP address, and providing the content for generation of mail and/or emails directed to a campaign.

At block 1305 server 106 captures an IP address, and optionally visit data, associated with a visit to an electronic resource and/or submission of one or more searches. At block 1310, the server 106 provides the IP address, the electronic resource identifier, and/or the visit data to the content generation system 160. In some implementations, blocks 1305 and 1310 share one or more (e.g., all) aspects in common with blocks 1105 and 1110 of FIG. 11 and/or blocks 1205 and 1210 of FIG. 12.

At block 1315, the content generation system 160 (e.g., the IP address engine 162) receives the data provided by server 106 at block 1310, and generates a hash value based on the IP address. For example, the content generation system 160 may apply a hash function to the IP address to generate the hash value. In some implementations, block 1315 shares one or more (e.g., all) aspects in common with block 1215 of FIG. 12.

At block 1320, the content generation system 160 (e.g., the campaign engine 164) identifies a campaign based on the electronic resource identifier and/or based on the visit data. For example, as illustrated in FIG. 10, the content generation system 160 may be in communication with campaigns database 114 and may identify the campaign based on a mapping between campaign and the electronic resource identifier and/or the visit data in campaigns database 114. In some implementations, block 1320 shares one or more (e.g., all) aspects in common with block 1120 of FIG. 11 and/or block 1225 of FIG. 12.

At block 1325, the content generation system 160 provides the hash value, the identification of the campaign, and optionally the visit data to the content providing system 170. For example, the content generation system 160 may transmit the hash value, the identification of the campaign, and optionally the visit data to the content providing system 170 via the network 101 and an application programming interface (API) of the content providing system 170. In some implementations, block 1325 shares one or more (e.g., all) aspects in common with block 1230 of FIG. 12.

At block 1330, the content providing system 170 receives the data provided at block 1325 and generates mail and/or email directed to a campaign based on that data and utilizing a hash table, such as hash table 175 of FIG. 10. The hash table is utilized by the content providing system 170 to determine a physical address and/or email address based on the hash value. In some implementations, the content providing system 170 may utilize the received identification of the campaign to select at least some content of mail and may include, on the mail, a physical address determined utilizing the hash table. Where the data provided at block 1330 also includes the visit data, the content providing system 170 may utilize the visit data to tailor at least some non-address content of the mail to the visit data. For instance, if the visit data indicates one of a plurality of electronic resources assigned to a postal campaign, the content providing system 170 may include non-address content on the mail that is particularized to that electronic resource.

In some implementations, the content providing system 170 may utilize the received identification of the postal campaign to generate an email directed to the campaign and may include, as a recipient of the email, the email address determined utilizing the hash table 175. The non-address content of the email may be generated based on data retrieved by the content providing system 170 from campaigns database 114 and/or data included at block 1325. Where the data provided at block 1325 also includes the visit data, the content providing system 170 may utilize the visit data to tailor non-address content of the email to the visit data. In some implementations, block 1330 shares one or more (e.g., all) aspects in common with block 1235 of FIG. 12.

In implementations where the content generation system 160 and/or the content providing system 170 are implemented on different hardware resources and/or controlled by different entities, the example of FIG. 13 may potentially provide one or more benefits related to security of personally identifiable information in one or more computer systems and/or in transmissions between one or more computer systems, such as those described above with respect to FIG. 12. Although FIG. 13 is described with respect to a single IP address associated with a visit to a single electronic resource and/or submission of a single search, it is understood that one or more of blocks 1305-1330 are typically performed with additional IP addresses, additional electronic resources, and/or additional search submissions.

Figure 14:
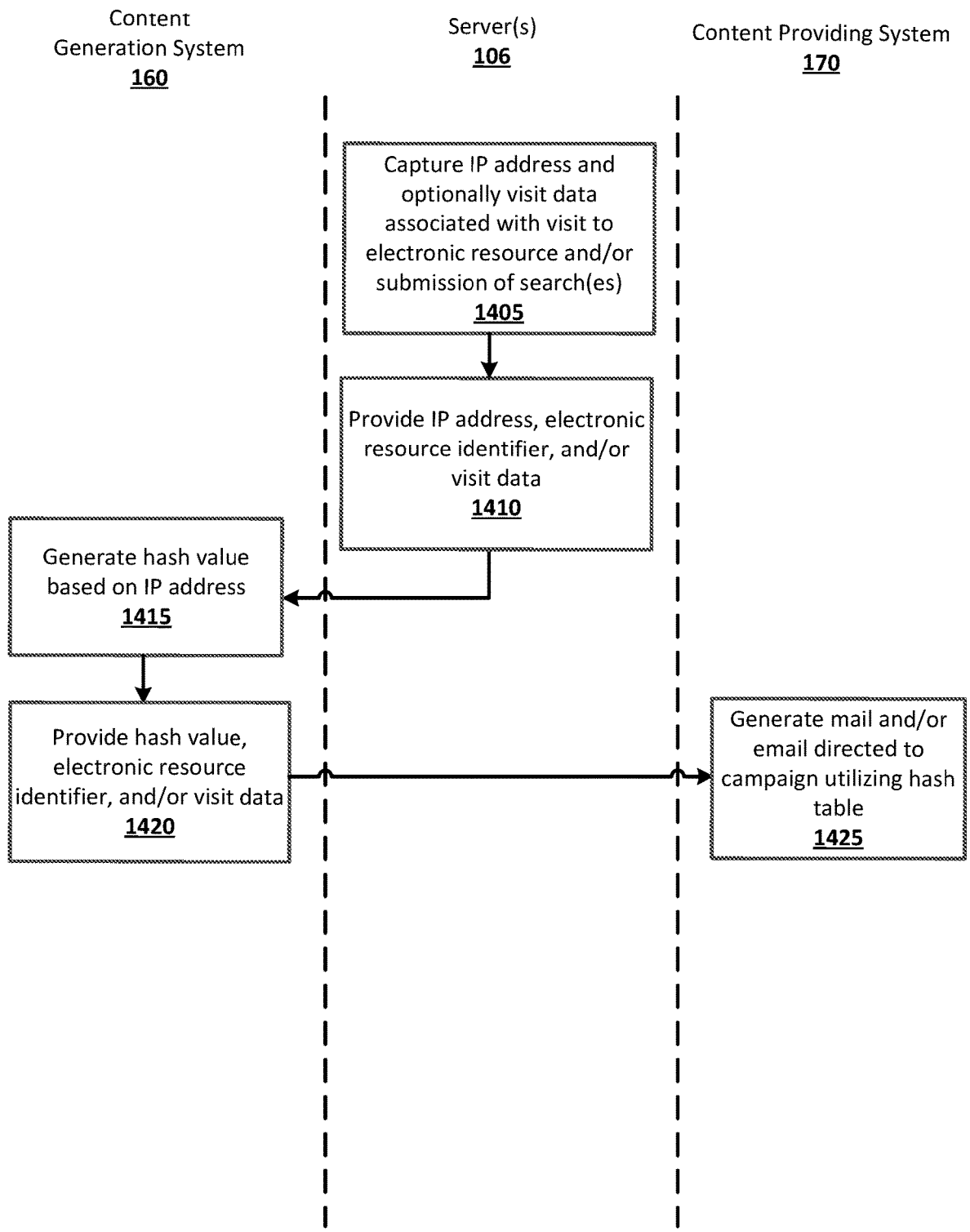
FIG. 14 illustrates yet another example of capturing an IP address associated with a visit to an electronic resource and/or an electronic submission of a search, generating content based on the captured IP address, and providing the content for generation of mail and/or email directed to a campaign.

FIG. 14 illustrates yet another example of capturing an IP address associated with a visit to an electronic resource and/or an electronic submission of a search, generating postal and/or email content based on the captured IP address, and providing the content for generation of mail and/or emails directed to a campaign.

At block 1405 server 106 captures an IP address, and optionally visit data, associated with a visit to an electronic resource and/or submission of one or more searches. At block 1410, the server 106 provides the IP address, an electronic resource identifier, and/or the visit data to the content generation system 160. In some implementations, blocks 1405 and 1410 share one or more (e.g., all) aspects in common with blocks 1105 and 110 of FIG. 11, blocks 1205 and 1210 of FIG. 12, and/or blocks 1305 and 1310 of FIG. 13.

At block 1415, the content generation system 160 receives the data provided by server 106 at block 1410, and generates a hash value based on the IP address. For example, the content generation system 160 may apply a hash function to the IP address to generate the hash value. In some implementations, block 1415 shares one or more (e.g., all) aspects in common with block 1215 of FIG. 12 and/or block 1315 of FIG. 13.

At block 1420, the content generation system 160 provides the hash value, the electronic resource identifier, and/or the visit data to the content providing system 170. For example, the content generation system 160 may transmit the hash value, the electronic resource identifier, and optionally the visit data to the content providing system 170 via the network 101 and an application programming interface (API) of the content providing system 170. In some implementations, the content providing system 170 transmits the hash value and the electronic resource identifier, optionally without transmitting the visit data. In some implementations, the content providing system 170 transmits the hash value and search content of the visit data, optionally without transmitting any electronic resource identifier.

At block 1420, the content providing system 170 receives the data provided at block 1420 and generates mail and/or email directed to a campaign based on that data and utilizing a hash table, such as hash table 175 of FIG. 10. The hash table is utilized by the content providing system 170 to determine a physical address and/or email address based on the hash value.

The content providing system 170 may utilize the received electronic identifier and/or the visit data to identify a campaign and generate non-address (non-physical address and/or non-email address) content based on the identified campaign. For example, as illustrated in FIG. 10, the content providing system 170 may be in communication with campaigns database 114 and may identify the campaign based on a mapping between the electronic resource identifier and the campaign in campaigns database 114. Also, for example, a campaign may be mapped in campaigns database 114 to a particular electronic resource and to one or more particular values for UTM codes—and the content providing system 170 may identify that campaign only when the received electronic resource identifier matches the particular electronic resource and when the visit data includes the particular values for the UTM codes. Also, for example, a campaign may be mapped in campaigns database 114 to a particular electronic resource and to one or more particular click paths—and the content providing system 170 may identify that campaign only when the received electronic resource identifier matches the particular electronic resource and when the received visit data indicates one of the particular click paths.

FIG. 15 is a flow chart of an example method according to various implementations described herein. Other implementations may perform the steps in a different order, omit certain steps, and/or perform different and/or additional steps than those illustrated in FIG. 15. For convenience, aspects of FIG. 15 will be described with reference to a system of one or more components that may perform the method, such as the content generation system 160 and/or the content providing system 170 of FIG. 10.

At step 1500, the system receives search instances. In some implementations, each of the search instances includes: a source identifier transmitted over one or more networks in conjunction with submission of one or more searches associated with the search instance; and search content of the one or more searches associated with the search instance.

The source identifier of a search instance indicates one or more characteristics of at least one of: at least one computing device that submitted the one or more searches of the search instance and a user of the at least one computing device that submitted the one or more searches of the search instance. For example, the source identifier of a search instance may include: an IP address, User ID (e.g., ID used in a sign-in to an Internet service), Device ID (e.g., MAC address and/or other identifier of computing device that submitted the search), and/or a Cookie ID.

The search content of a search instance indicates at least one of: content included in one or more of the searches of the search instance, and content (e.g., search results) provided in response to one or more of the searches of the search instance. For example, a search instance may be associated with only a single search and the search content of that search instance may include: the particular terms of that search; a category and/or other generalization of that search; particular search results returned for that search; and/or categories and/or other generalization of search results returned for that search. As another example, a search instance may be associated with a plurality of searches such as multiple sequential searches or multiple non-sequential searches all originating from the same IP address and/or other source identifier. In such an example, the search content of that search instance may include: particular terms for each of the searches; a category and/or other generalization for each of the searches; a category and/or other generalization of the searches collectively; particular search results returned for one or more of the searches; and/or categories and/or other generalization of search results returned for one or more of the searches.

The system may receive one or more of the search instances at step 1500 from one or more of various sources. For example, the system may receive one or more of the search instances from a search engine that receives and acts upon searches. Also, for example, the system may receive one or more of the search instances from an Internet service provider based on searches routed through the one or more servers of the Internet service provider. As yet another example, the system may receive one or more of the search instances directly from computing devices that submitted the corresponding searches. As yet an additional example, the system may receive one or more of the search instances from a toolbar and/or mobile application installed on a computing devices, based on searches submitted via the toolbar and/or mobile application.

At step 1505, the system determines a group of the search instances based on search content of the search instances of the group being assigned to campaign parameters. For example, campaign parameters of a campaign may include: one or more particular searches (e.g., searches of "health insurance", "health insurance cost", "health insurance providers", etc.); particular terms of searches (e.g., searches that include "health", searches that include both "health" and "insurance", etc.); particular categories of searches (e.g., "health insurance related" searches); and/or particular search results and/or search result categories. The group of search instances may be determined based on the group including one or more of the campaign parameters.

In some implementations, the system additionally or alternatively determines the group based on the source identifier of the search instances of the group satisfying one or more campaign parameters. For example, the campaign parameters may include one or more particular ZIP codes, census blocks, states, etc. —and search instances included in the group based on their source identifier satisfying those campaign parameters. For instance, where the source identifier of a search instance is an IP address, a physical address of the IP address may be determined (e.g., from IP database 110) and compared to the campaign parameters to determine whether to include that search instance in the group.

At step 1510, the system determines, for each of a plurality of the search instances of the group determined at step 1505, a particular email address and/or physical address assigned to the search instance. For example, the system may access a mapping of source identifiers to physical addresses and/or email addresses and identify physical addresses and/or email addresses for those source identifiers included in the search instances. For instance, the system may user IP database 110 to identify physical addresses and/or email addresses that are mapped to source identifiers of the group that are IP addresses.

At optional step 1515, the system optionally determines geographically similar additional physical addresses and/or additional email addresses. In some implementations, whether the system determines geographically similar additional addresses may be based on the campaign parameters. For example, for certain campaigns (e.g., a campaign of a roofing company targeting roof replacement due to hail damage) it may be desirable to target additional geographically similar parties, whereas for certain other campaigns it may not (e.g., a campaign of a clothing company). In some implementations, the system utilizes IP database 110 or other resource to determine one or more additional email addresses that are geographically similar to a given search instance of the group. For example, a given search instance may include an IP address as a source identifier and the system may determine a physical address for that IP address utilizing IP database 110. The system may further determine geographically similar physical addresses in the IP database 110 (e.g., those that are in the same neighborhood, census block, street) and identify email addresses mapped to those geographically similar physical addresses in the IP database 110.

At step 1520, the system transmits content that identifies the campaign parameters and that includes or is mapped to: the particular email addresses and/or the particular physical addresses; and/or the additional physical addresses and/or additional email addresses optionally determined at step 1515. In some implementations, the content may optionally also include one or more aspects of the search content associated with each of the particular email addresses and/or the particular physical addresses. In some implementations, the transmitted content may already be in "email" and/or "mail" format while in other implementations the transmitted content may not be.

In some implementations, the system may generate and/or transmit the content utilizing one or more techniques to maintain privacy of certain data. For example, the system may optionally utilize one or more hashing techniques such as those described with respect to FIGS. 12, 13, and 14. Also, for example, the system may include additional physical addresses and/or email addresses in the content and indicate them as associated with the campaign parameters, where those additional physical addresses and/or email addresses are not associated with source identifiers of the group of search instances identified at step 1505 (and may be in addition to any additional physical addresses and/or email addresses determined at optional step 1515). In other words, the content will include (or be mapped to) physical addresses and/or email addresses of both: users associated with the search instances of the group; and users that are not associated with the search instances of the group.

In some implementations, at step 1520 the system transmits the content to one or more other systems controlled by one or more parties that are the same as the one or more parties that control the systems that perform steps 1500, 1505, 1510, 1515, and/or 1520. In some implementations, at step 1520 the system transmits the content to one or more other systems controlled by one or more parties that are different from one or more parties that control the systems that perform steps 1500, 1505, 1510, 1515, and/or 1520. In some of those implementations, at step 1520 the system may transmit the content in response to the one or more other parties winning an online-auction of the content.

At optional step 1525, the system generates and/or transmits emails based on the content transmitted at block 1520. For example, the system may generate an email that includes at least one of the email addresses of the content as a recipient and that includes content based on the campaign parameters and/or based on aspects of the search content associated with the email address in the content (e.g., to enable tailoring of the email based on those aspects). The system may then transmit the generated email over one or more networks. In some implementations, the content transmitted at block 1520 is already in an email format and the system may transmit such emails.

At optional block 1530, the system generates mail based on the content transmitted at block 1520. For example, the system may generate a mail item that includes a physical address of the content as an addressee and that includes content based on the campaign parameters and/or based on aspects of the search content associated with the physical address in the content (e.g., to enable tailoring of the mail based on those aspects). In some implementations, the content transmitted at block 1520 is already in a mail format.

Figure 16:
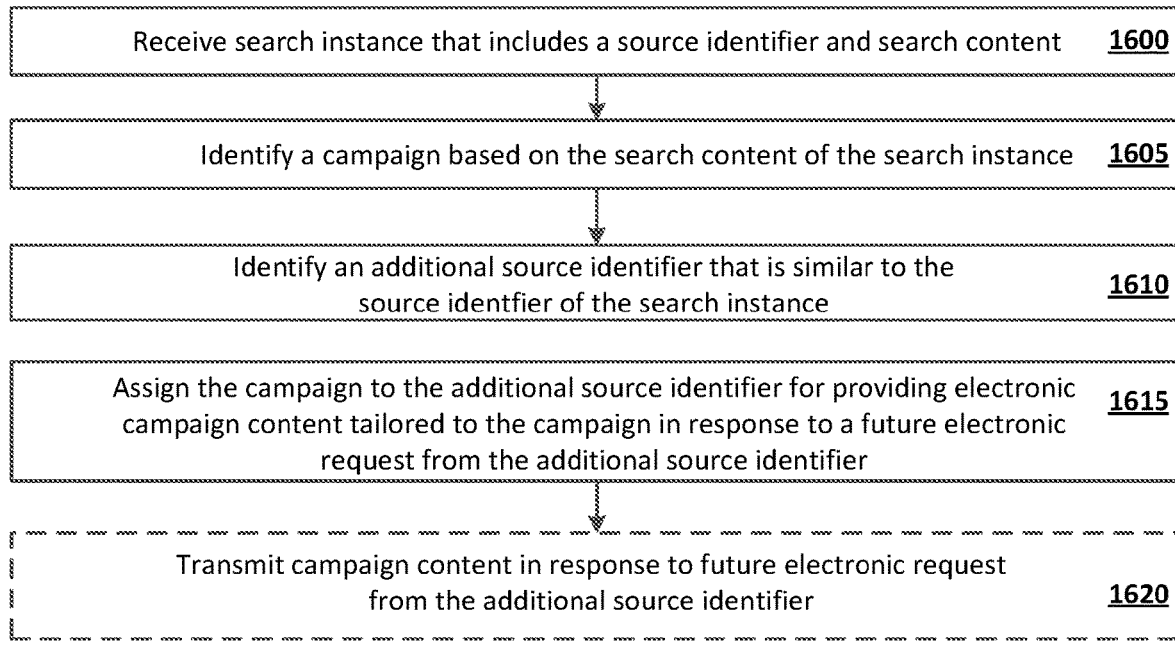
FIG. 16 is a flow chart of another example method according to implementations described herein.

FIG. 16 is a flow chart of another example method according to various implementations described herein. Other implementations may perform the steps in a different order, omit certain steps, and/or perform different and/or additional steps than those illustrated in FIG. 16. For convenience, aspects of FIG. 16 will be described with reference to a system of one or more components that may perform the method, such as the content generation system 160 and/or the content providing system 170 of FIG. 10.

At step 1600, the system receives a search instance that includes: a source identifier transmitted over one or more networks in conjunction with submission of one or more searches associated with the search instance; and search content of the one or more searches associated with the search instance.

The source identifier indicates one or more characteristics of at least one of: at least one computing device that submitted the one or more searches of the search instance and a user of the at least one computing device that submitted the one or more searches of the search instance. For example, the source identifier of a search instance may include: an IP address, User, Device ID, and/or a Cookie ID.

The search content of a search instance indicates at least one of: content included in one or more of the searches of the search instance and content (e.g., search results) provided in response to one or more of the searches of the search instance. The system may receive the search instance at step 1600 from one or more of various sources.

At step 1605, the system identifies a campaign based on the search content of the search instance. For example, the system may identify the campaign based on one or more campaign parameters of the campaign being assigned to the search content of the search instance. In some implementations, the system additionally or alternatively identifies the campaign based on the source identifier of the search instance of the search instance satisfying one or more campaign parameters.

At step 1610, the system identifies an additional source identifier that is similar to the source identifier of the search instance.

As one example of step 1610, the source identifier of the search instance may include a given IP address and the system may identify an additional IP address that is geographically similar to the given IP address. For example, the system may utilize IP database 110 or other resource to determine the additional IP address that is geographically similar to the given IP address of the search instance. For instance, the system may determine a physical address for the given IP address utilizing IP database 110. The system may determine the additional IP address based on it being assigned to a similar physical addresses in the IP database 110 (e.g., in the same neighborhood, census block, street). As yet another example, the system may utilize the masked addresses to physical locations database 145 (FIGS. 1 and 9) and/or associated techniques to identify the additional IP address. For instance, the system may determine the additional IP address based on it and the given IP address having the same masked address and/or based on the masked addresses to physical locations database 145 indicating that the same masked address is associated with at least a threshold degree of statistical physical location distribution.

As another example of step 1610, the source identifier of the search instance may include a given IP address and a given additional source identifier (e.g., a User ID, Device ID, and/or Cookie ID)—and the system may identify an additional source identifier that indicates the given IP address in combination with any additional source identifier that is different from the given additional source identifier of the search instance. Using the given IP address in combination any additional source identifier that is different from the given additional source identifier may enable targeting of digital content of the campaign (e.g. at step 1620) to other individuals that share the given IP address, but that are different from the individual associated with the search instance of step 1600. For instance, assume the given IP address is associated with a business and the given additional source identifier of the search instance is a given MAC address. Using the given IP address in combination any additional MAC address that is different from the given MAC address may enable targeting of the campaign to other computing devices that have the same IP address, but a different MAC address (and that may be utilized by other individuals).

Although step 1610 is described with respect to identifying an additional source identifier that is similar to the source identifier of a single search instance, in some implementations multiple similar additional source identifiers may be identified at step 1610 and/or may be identified based on multiple search instances received at step 1600. For example, five search instances may be received at step 1600 that each include a different IP address. At step 1605, the system may identify that all five search instances are mapped to the campaign. At step 1610, the system may identify that the five IP addresses of the five search instances are all geographically similar to one another and, as a result, identify additional IP addresses that are geographically similar to the five IP addresses.

At step 1615, the system assigns the campaign to the additional source identifier for providing electronic campaign content tailored to the campaign in response to a future electronic request from the additional source identifier.

At optional step 1620, the system transmits the campaign content in response to a future electronic request from the additional source identifier. In some implementations, the future electronic request may be unassociated with a search. For example, the future electronic request may be a request for a webpage and/or a request to access content of an application.

Some implementations of the method of FIG. 16 enables "extension" of a campaign to additional IP addresses and/or other additional source identifiers that are similar to source identifiers associated with searches that are associated with the campaign. Accordingly, even though the additional source identifiers may not be directly associated with searches or other web based activities that are associated with the campaign, digital content based on the campaign may still be provided in response to electronic requests received from the additional source identifiers. This may be beneficial in many scenarios, such as the roof/hail scenario discussed herein, scenarios where it may be desirable to target multiple additional individuals/devices of a business or household in response to certain searches from that business or household that originated from other individuals/devices, and/or other scenarios.

Although steps of the method of FIG. 16 are described with respect to a search instance, in some implementations the method of FIG. 16 may be adapted for use with visits to electronic resources. For example, at step 1600 a source identifier associated with a visit to an electronic resource, an identifier of the electronic resource, and/or visit data may be received—and at step 1605 the campaign may be identified based on the identifier of the electronic resource.

Figure 17:
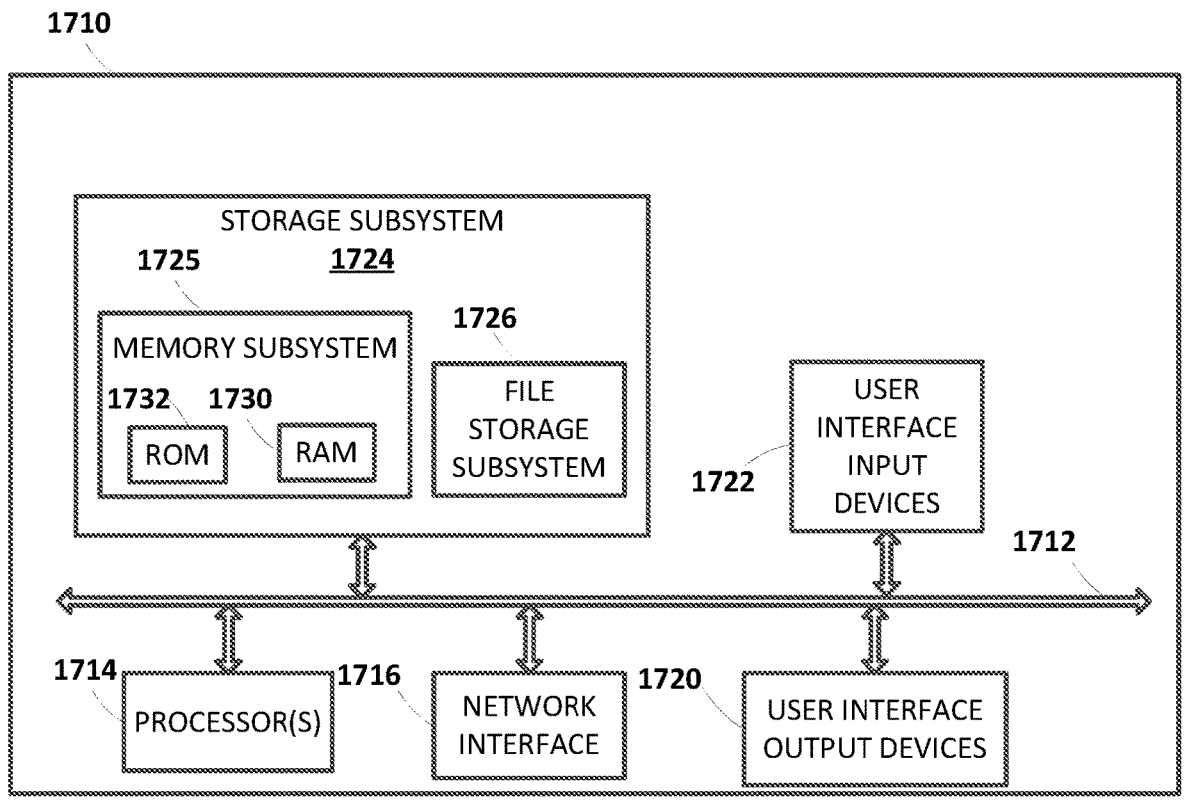
FIG. 17 illustrates an example architecture of a computer system.

FIG. 17 is a block diagram of an example computer system 1710. Computer system 1710 typically includes at least one processor 1714 which communicates with a number of peripheral devices via bus subsystem 1712. These peripheral devices may include a storage subsystem 1724, including, for example, a memory subsystem 1725 and a file storage subsystem 1726, user interface input devices 1722, user interface output devices 1720, and a network interface subsystem 1716. The input and output devices allow user interaction with computer system 1710. Network interface subsystem 1716 provides an interface to outside networks and is coupled to corresponding interface devices in other computer systems.

User interface input devices 1722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1710 or onto a communication network.

User interface output devices 1720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1710 to the user or to another machine or computer system.

Storage subsystem 1724 stores programming and data constructs that provide the functionality of some or all of the modules described herein. For example, the storage subsystem 1724 may include the logic to perform one or more of the methods described herein such as, for example, the methods of FIGS. 3, 5, 7, 12, 13, 14, 15, and/or 16.

These software modules are generally executed by processor 1714 alone or in combination with other processors. Memory 1725 used in the storage subsystem can include a number of memories including a main random access memory (RAM) 1730 for storage of instructions and data during program execution and a read only memory (ROM) 1732 in which fixed instructions are stored. A file storage subsystem 1726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1726 in the storage subsystem 1724, or in other machines accessible by the processor(s) 1714.

Bus subsystem 1712 provides a mechanism for letting the various components and subsystems of computer system 1710 communicate with each other as intended. Although bus subsystem 1712 is shown schematically as a single bus, alternative implementations of the bus subsystem may use multiple busses.

Computer system 1710 can be of varying types including a workstation, server, computing cluster, blade server, server farm, or any other data processing system or computing device. Due to the ever-changing nature of computers and networks, the description of computer system 1710 depicted in FIG. 17 is intended only as a specific example for purposes of illustrating some implementations. Many other configurations of computer system 1710 are possible having more or fewer components than the computer system depicted in FIG. 17.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving a search instance comprising:
      a source identifier transmitted over one or more networks in conjunction with electronic submission of at least one search associated with the search instance, the source identifier indicating one or more characteristics of at least one of: a computing device that submitted the search instance and a user of the computing device that submitted the search instance, and
      search content of the one search associated with the search instance, the search content indicating at least one of: content included in the search and content provided in response to the search;
   identifying a campaign based on the campaign being electronically stored in association with the search content of the search instance;
   based on the campaign being electronically stored in association with the search content of the search instance, and based on the search instance including the source identifier:
      determining a physical address that is assigned, in a database, to the source identifier of the search instance; and
      assigning the campaign to the physical address in one or more computer readable media for providing, to the physical address associated with the source identifier, postal mail that is tailored to the campaign.

2. The method of claim 1, wherein the source identifier includes, or is based on: a device ID, a device fingerprint, or a cookie.

3. The method of claim 2, wherein the source identifier includes the device ID.

4. The method of claim 2, wherein the search content includes the content included in the search.

5. The method of claim 4, wherein the content included in the search includes terms of the search.

6. The method of claim 4, wherein the search content includes the content provided in response to the search.

7. The method of claim 1, wherein the search content is received from the computing device that submitted the search.

8. The method of claim 1, further comprising, based on the campaign being electronically stored in association with the search content of the search instance, and based on the search instance including the source identifier:
   determining, an additional physical address that satisfies one or more geographic proximity criteria relative to the physical address assigned to the source identifier of the search instance, wherein the additional physical address is different from the physical address assigned to the source identifier of the search instance; and
   assigning the campaign to the additional physical address in one or more computer readable media for providing, to the additional physical address associated with the additional source identifier, additional postal mail that is tailored to the campaign.

9. The method of claim 1, further comprising:
generating the postal mail that is tailored to the campaign, wherein generating the postal mail is in response to assigning the campaign to the physical address in the one or more computer readable media and comprises including the physical address as a recipient address of the postal mail.

10. The method of claim 9, wherein generating the postal mail further comprises tailoring the postal mail to the campaign by including, in the postal mail, particular content that is stored in association with the campaign and the search content of the search instance.

11. The method of claim 1, further comprising:
transmitting, in response to assigning the campaign to the physical address in the one or more computer readable media, the physical address to a remote system, wherein transmitting the physical address to the remote system causes generation of the postal mail that is tailored to the campaign.

12. A system, comprising:
a network interface;
memory storing instructions;
one or more processors operable to execute the instructions stored in the memory to:
  receive, via the network interface, a search instance comprising:
    a source identifier associated with electronic submission of at least one search associated with the search instance, the source identifier indicating one or more characteristics of at least one of: a computing device that submitted the search instance and a user of the computing device that submitted the search instance, and
    search content of the one search associated with the search instance, the search content indicating at least one of: content included in the search and content provided in response to the search;
  identify a campaign based on the campaign being electronically stored in association with the search content of the search instance;
  based on the campaign being electronically stored in association with the search content of the search instance, and based on the search instance including the source identifier:
    determine a physical address that is assigned, in a database, to the source identifier of the search instance; and
    assign the campaign to the physical address in one or more computer readable media for providing, to the physical address associated with the source identifier, postal mail that is tailored to the campaign.

13. The system of claim 12, wherein the one or more characteristics, indicated by the source identifier, include device characteristics of the computing device that submitted the search instance.

14. The system of claim 13, wherein the one or more characteristics, indicated by the source identifier, include users characteristics of the user that submitted the search instance.

15. The system of claim 12, wherein the search content includes the content included in the search.

16. The system of claim 15, wherein the content included in the search includes terms of the search.

17. The system of claim 12, wherein the search content is received from the computing device that submitted the search.

18. The system of claim 12, wherein one or more of the processors are further operable to execute the instructions stored in the memory to:
based on the campaign being electronically stored in association with the search content of the search instance, and based on the search instance including the source identifier:
  determine an additional physical address that satisfies one or more geographic proximity criteria relative to the physical address assigned to the source identifier of the search instance, wherein the additional physical address is different from the physical address assigned to the source identifier of the search instance; and
  assign the campaign to the additional physical address in one or more computer readable media for providing, to the additional physical address associated with the additional source identifier, additional postal mail that is tailored to the campaign.

19. The system of claim 12, wherein one or more of the processors are further operable to execute the instructions stored in the memory to:
generate the postal mail that is tailored to the campaign, wherein generating the postal mail is in response to assigning the campaign to the physical address in the one or more computer readable media and comprises including the physical address as a recipient address of the postal mail.

20. The system of claim 12, wherein one or more of the processors are further operable to execute the instructions stored in the memory to:
transmit, in response to assigning the campaign to the physical address in the one or more computer readable media, the physical address to a remote system that generates the postal mail that is tailored to the campaign.

* * * * *